United States Patent
Ding et al.

(10) Patent No.: US 11,917,213 B2
(45) Date of Patent: Feb. 27, 2024

(54) LIVE STREAMING PROCESSING METHOD, APPARATUS, ELECTRONIC DEVICE, AND COMPUTER-READABLE STORAGE MEDIUM

(71) Applicant: Tencent Technology (Shenzhen) Company Limited, Shenzhen (CN)

(72) Inventors: Longqi Ding, Shenzhen (CN); Di Chen, Shenzhen (CN); Shuyou Li, Shenzhen (CN); Hengkai Wan, Shenzhen (CN); Junqiu Lu, Shenzhen (CN); Yan Long, Shenzhen (CN); Fenglian Wei, Shenzhen (CN); Ting Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 52 days.

(21) Appl. No.: 17/948,090

(22) Filed: Sep. 19, 2022

(65) Prior Publication Data
US 2023/0018134 A1     Jan. 19, 2023

Related U.S. Application Data

(63) Continuation of application No. PCT/CN2021/100283, filed on Jun. 16, 2021.

(30) Foreign Application Priority Data

Jul. 15, 2020   (CN) .......................... 202010679979.5

(51) Int. Cl.
*H04N 21/2187*   (2011.01)
*H04N 21/25*      (2011.01)
(Continued)

(52) U.S. Cl.
CPC ....... *H04N 21/2187* (2013.01); *H04N 21/251* (2013.01); *H04N 21/25875* (2013.01); *H04N 21/4882* (2013.01)

(58) Field of Classification Search
CPC ............. H04N 21/2187; H04N 21/251; H04N 21/25875; H04N 21/4882
See application file for complete search history.

(56) References Cited

U.S. PATENT DOCUMENTS

2019/0281327 A1*  9/2019  Li ...................... H04N 21/2393
2019/0313146 A1  10/2019  Kakuschke et al.
(Continued)

FOREIGN PATENT DOCUMENTS

| CN | 106331881 A | 1/2017 |
|----|-------------|--------|
| CN | 106470343 A | 3/2017 |

(Continued)

OTHER PUBLICATIONS

Tencent Technology, WO, PCT/CN2021/100283, dated Sep. 15, 2021, 7 pgs.

(Continued)

*Primary Examiner* — Mulugeta Mengesha
(74) *Attorney, Agent, or Firm* — Morgan, Lewis & Bockius LLP

(57) ABSTRACT

This application provides a live streaming processing method performed by an electronic device. The method includes: displaying a live streaming room, the live stream room having a host account, a host sub-account and multiple viewer accounts, the host sub-account being used for assisting the host account of the live streaming room in operation; receiving real-time live streaming data of the live streaming room, and displaying a live streaming content on a live streaming room page according to the real-time live streaming data, the real-time live streaming data collected from the (Continued)

host account and the viewer accounts; and displaying, in response to a live streaming room operation of the host sub-account, an operation result of the live streaming room operation of the host sub-account in the live streaming room, wherein the operation result of the live streaming room operation updates the live streaming content on the live streaming room page.

20 Claims, 13 Drawing Sheets

(51) Int. Cl.
*H04N 21/258* (2011.01)
*H04N 21/488* (2011.01)

(56) References Cited

U.S. PATENT DOCUMENTS

2021/0021663 A1* 1/2021 Zhou .................. H04L 65/65
2021/0306700 A1* 9/2021 Xie .................... H04N 21/4756
2022/0191557 A1* 6/2022 Zhang ................ G06Q 30/0201
2022/0360830 A1* 11/2022 Wang ................. H04N 21/4788

FOREIGN PATENT DOCUMENTS

| CN | 109635526 A | 4/2019 |
| CN | 110198483 A | 9/2019 |
| CN | 110996111 A | 4/2020 |
| CN | 111263181 A | 6/2020 |
| WO | WO 2018072375 A1 | 4/2018 |

OTHER PUBLICATIONS

Tencent Technology, IPRP, PCT/CN2021/100283, dated Jan. 17, 2023, 5 pgs.

Tencent Technology, ISR, PCT/CN2021/100283, dated Sep. 15, 2022, 3 pgs.

* cited by examiner

LIVE STREAMING PROCESSING METHOD, APPARATUS, ELECTRONIC DEVICE, AND COMPUTER-READABLE STORAGE MEDIUM

CROSS-REFERENCE TO RELATED APPLICATIONS

This application is a continuation application of PCT Patent Application No. PCT/CN2021/100283, entitled "LIVESTREAMING PROCESSING METHOD AND APPARATUS, ELECTRONIC DEVICE, AND COMPUTER READABLE STORAGE MEDIUM" filed on Jun. 16, 2021, which claims priority to Chinese Patent Application No. 202010679979.5, filed with the State Intellectual Property Office of the People's Republic of China on Jul. 15, 2020, and entitled "LIVE STREAMING PROCESSING METHOD AND DEVICE, ELECTRONIC EQUIPMENT AND COMPUTER READABLE STORAGE MEDIUM", all of which are incorporated herein by reference in their entirety.

FIELD OF THE TECHNOLOGY

This application relates to Internet technologies, and in particular, to a live streaming processing method, apparatus, electronic device, and computer-readable storage medium.

BACKGROUND OF THE DISCLOSURE

Online social based on live streaming has become an important form of Internet information propagation. The performance of a host is synchronized to a viewer in a live streaming room through a network. The presentation of a content in the live streaming room is diversified. For example, the host needs to perform various live streaming room operations while performing, so as to integrate various forms of interactive content into a live streaming content (that is, a performance content of the host). However, if the host considers both the performance and the live streaming room operation, the live streaming effect will inevitably be affected due to distraction.

A live streaming client of related technologies supports the host to set a viewer as a presenter during the live streaming to assist the host in the live streaming room operation. This requires elevating the permission of a viewer account during the live streaming, and revoking the permission of the viewer account after the live streaming. Frequent permission changing operations excessively consume resources of a live streaming system server, and there is a hidden danger for information security.

SUMMARY

Embodiments of this application provide a live streaming processing method, apparatus, electronic device, and computer-readable storage medium, which can realize diversified presentation of contents in a live streaming room while ensuring resource intensive use and information security.

The technical solutions in the embodiments of this application are implemented as follows:

The embodiments of this application provide a live streaming processing method, the method being performed by an electronic device, and including:

displaying a live streaming room, the live stream room having an associated host account, a host sub-account and a plurality of viewer accounts, all accounts being in a logged-in status in the live streaming room, the host sub-account being different from the viewer accounts of the live streaming room and used for assisting the host account of the live streaming room in operation;

receiving real-time live streaming data of the live streaming room, and displaying a live streaming content on a live streaming room page according to the real-time live streaming data, the real-time live streaming data being collected from the host account and the viewer accounts after logging in to the live streaming room; and displaying, in response to a live streaming room operation of the host sub-account, an operation result of the live streaming room operation of the host sub-account in the live streaming room, wherein the operation result of the live streaming room operation updates the live streaming content on the live streaming room page.

The embodiments of this application provide a live streaming processing apparatus, including:

a host sub-account login module configured to display a live streaming room, the live stream room having an associated host account, a host sub-account and a plurality of viewer accounts, all accounts being in a logged-in status in the live streaming room, the host sub-account being different from the viewer accounts of the live streaming room and used for assisting the host account of the live streaming room in operation;

a live streaming content display module configured to receive real-time live streaming data of the live streaming room, and displaying a live streaming content on a live streaming room page according to the real-time live streaming data, the real-time live streaming data being collected from the host account and the viewer accounts after logging in to the live streaming room; and an operation result display module configured to display, in response to a live streaming room operation of the host sub-account, an operation result of the live streaming room operation of the host sub-account in the live streaming room, wherein the operation result of the live streaming room operation updates the live streaming content on the live streaming room page.

The embodiments of this application provide a live streaming processing method, the method being performed by an electronic device, and including:

displaying, in response to a host sub-account configuration operation of a host account, a successfully configured host sub-account;

the host sub-account being different from a viewer account of the live streaming room and used for assisting the host account of the live streaming room in operation;

displaying a live streaming content of the live streaming room; and receiving an operation result of a live streaming room operation of the host sub-account, and displaying the operation result of the live streaming room operation of the host sub-account in the live streaming room.

The embodiments of this application provide a live streaming processing apparatus, including:

a host sub-account configuration module configured to display, in response to a host sub-account configuration operation of a host account, a successfully configured host sub-account;

the host sub-account being different from a viewer account of the live streaming room and used for assisting the host account of the live streaming room in operation;

a live streaming content display module configured to display a live streaming content of the live streaming room; and an operation result synchronization module configured to receive an operation result of a live streaming room operation of the host sub-account, and display the operation result of the live streaming room operation of the host sub-account in the live streaming room.

The embodiments of this application provide an electronic device, the electronic device including:

a memory configured to store executable instructions; and a processor configured to implement, when executing the executable instructions stored in the memory, the live streaming processing method according to the embodiments of this application.

The embodiments of this application provide a non-transitory computer-readable storage medium storing executable instructions for implementing, when executed by a processor, the live streaming processing method according to the embodiments of this application.

The embodiments of this application has the following beneficial effects:

A host sub-account different from a viewer account is used, and a live streaming room operation is performed by the host sub-account that inherits the permission of a host account, which saves frequent modification operations of the permission of the host account for the viewer account, and thereby saving resource consumption of related background operations, and improving the information security. At the same time, because of the assistance of the host sub-account, a host possessing the host account can focus on the performance itself, thereby ensuring the quality of diversified contents outputted in a live streaming.

DESCRIPTION OF EMBODIMENTS

Figure 1:
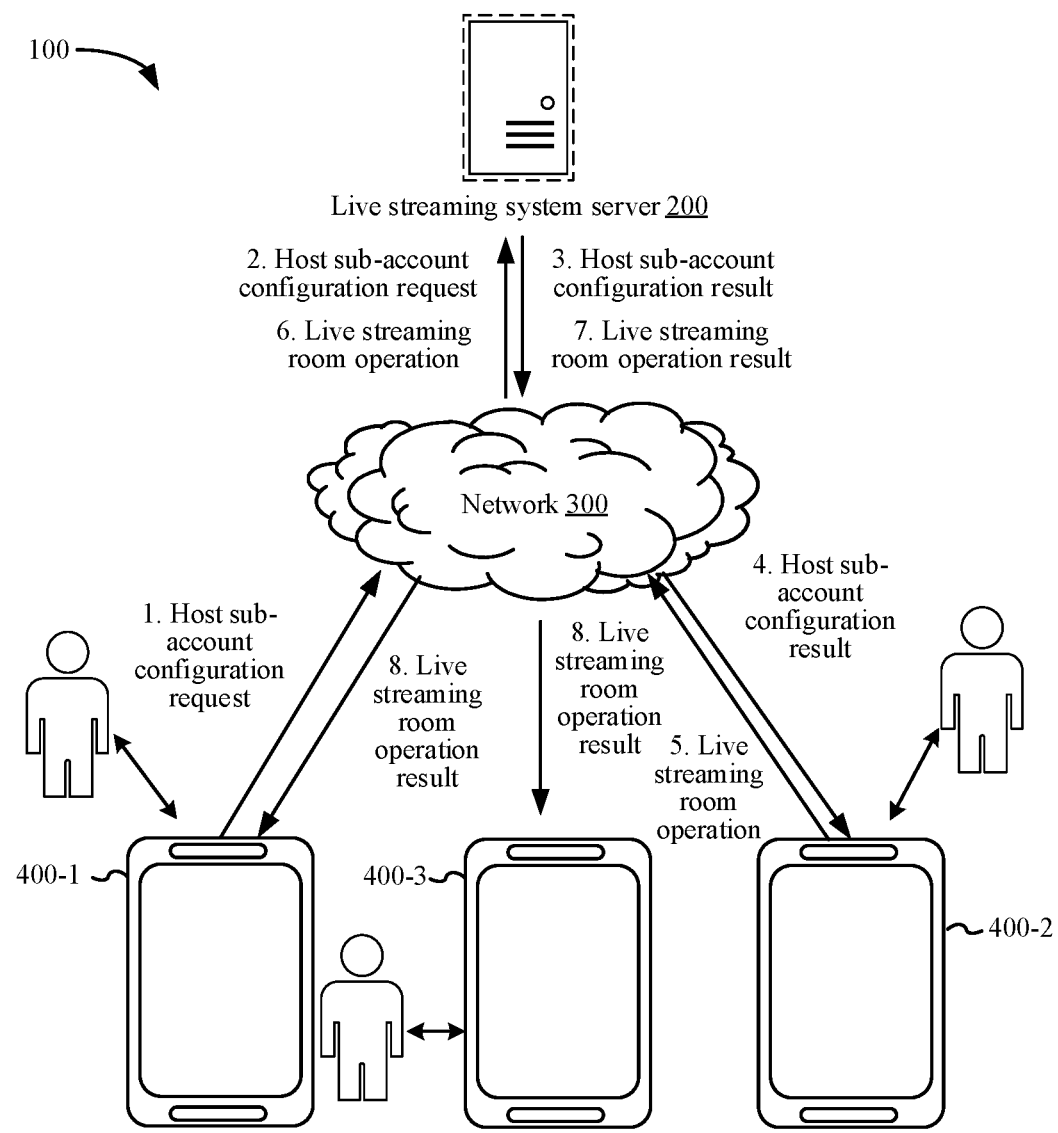
FIG. 1 is a schematic structural diagram of a live streaming processing system architecture 100 according to an embodiment of this application.

To make objectives, technical solutions, and advantages of this application clearer, the following describes this application in further detail with reference to the accompanying drawings. The described embodiments are not to be considered as a limitation to this application. All other embodiments obtained by a person of ordinary skill in the art without creative efforts shall fall within the protection scope of this application.

In the following description, the term "some embodiments" describes subsets of all possible embodiments, but it may be understood that "some embodiments" may be the same subset or different subsets of all the possible embodiments, and can be combined with each other without conflict.

In the following descriptions, the included term "first/second/third" is merely intended to distinguish similar objects but does not necessarily indicate a specific order of an object. It may be understood that "first/second/third" is interchangeable in terms of a specific order or sequence if permitted, so that the embodiments of this application described herein can be implemented in a sequence in addition to the sequence shown or described herein.

Unless otherwise defined, meanings of all technical and scientific terms used in this specification are the same as that usually understood by a person skilled in the technical field to which this application belongs. In this application, terms used in the specification of this application are merely intended to describe objectives of the specific embodiments, but are not intended to limit this application.

Before the embodiments of this application are further described in detail, a description is made on nouns and terms in the embodiments of this application, and the nouns and terms in the embodiments of this application are applicable to the following explanations.

1) Host account: It refers to an account possessed by a host to enter a live streaming room for performance.

2) Host sub-account (also referred to as a host secondary account): It refers to an account, in addition to the host account, that can enter the live streaming room as the host (specifically, the host sub-account) and has most of operation permissions of the host. For example, the operation permissions of the host include a mute operation, an information recommendation operation, an operation of moving a specified user out of the live streaming room, and an operation of ending the live streaming. The host sub-account has most of the operation permissions of the host. For example, the host sub-account has operation permissions including a mute operation, an information recommendation operation, and an operation of moving a specified user out of the live streaming room, but does not have an operation permission for an operation of ending the live streaming.

3) Host operation: It refers to an operation that can be performed only by an account with the operation permissions of the host.

In a related technology, a host may choose to put a live streaming terminal on a bracket in front of him/her in order to have a better picture during the live streaming, and the host is at a certain distance from the live streaming terminal. When performing an operation such as lottery drawing, muting, and pushing during the live streaming, the host usually needs to reach out for operation. Alternatively, if there is sufficient manpower, the host will put the live streaming terminal on the bracket and use a rear camera to shoot the host to acquire a live streaming content, and an assistant other than the host performs an operation such as lottery drawing, muting, and pushing. In another related technology, after a viewer enters a live streaming room, he/she is designated as a presenter by a host. The presenter is visible to viewers in the live streaming room and can manage the live streaming room. A live streaming room management result perceived by the viewers is triggered by the presenter (instead of the host). The applicant finds in the process of implementing the embodiments of this application that the operation of the host in the above scheme is inconvenient. For example, in a live streaming, for a host, the host operates frequently, every time the host performs an operation, he/she needs to reach out to operate a mobile phone, which is inconvenient for the smooth progress of the live streaming. For a viewer, the viewer experience is poor. Every time the host performs an operation, the reaching operation of the host interrupts the perfect viewing experience of the live streaming. In addition, it will also waste human resources, that is, if desirable host experience and viewer viewing experience are intended to be obtained, a host assistant is required to be responsible for operations of the live streaming room, which greatly wastes manpower. The technical solution for setting a host still has the following defects: a live streaming system background needs to perform permission elevation and permission degradation for a host in each live streaming in the live streaming room, and frequent permission elevation and permission degradation not only consume background resources but also have a high security risk for an account.

In order to solve the technical problems, the embodiments of this application provide a live streaming processing method, apparatus, electronic device, and computer-readable storage medium, which can solve the problems encountered by current hosts during live streaming, such as inconvenient operation, poor viewing experience of viewers, waste of manpower, resource consumption, and high security risks. An exemplary application of the electronic device provided by the embodiments of this application is described below. The electronic device provided by the embodiments of this application may be implemented as various types of user terminals such as a notebook computer, a tablet computer, a desktop computer, a set-top box, and a mobile device (for example, a mobile phone, a portable music player, a personal digital assistant, a dedicated messaging device, and a portable game device). An exemplary application when the electronic device is implemented as a terminal will be described below.

Referring to FIG. 1, a schematic structural diagram of a live streaming processing system 100 according to an embodiment of this application is shown. Terminals 400 (a host terminal 400-1, a sub-account terminal 400-2, and a viewer terminal 400-3 are shown as an example) are connected to a live streaming system server 200 through a network 300. The network 300 may be a wide area network or a local area network, or a combination of the two.

The host terminal 400-1 requests configuration of a host sub-account before a live streaming is started, and transmits the configuration request to the live streaming system server 200. The live streaming system server 200 receives the configuration request and assigns a corresponding permission to the host sub-account, and displays an identity prompt of the host sub-account on the sub-account terminal 400-2 to which the host sub-account is logged in. During the live streaming, a live streaming room operation request is transmitted to the live streaming system server 200 through the sub-account terminal to which the host sub-account is logged in, and an operation result is synchronized to the terminals (the host terminal 400-1, the sub-account terminal 400-2, and the viewer terminal 400-3) of a live streaming room.

In some embodiments, the live streaming system server 200 may be a stand-alone physical server, or may be a server cluster or distributed system formed by a plurality of physical servers, or may be a cloud server that provides basic cloud computing services such as a cloud service, a cloud database, cloud computing, a cloud function, cloud storage, a network service, cloud communications, a middleware service, a domain name service, a security service, a content delivery network (CDN), and a big data and artificial intelligence platform. The terminal 400 may be, but is not limited to, a smart phone, a pad, a laptop, a desktop, a smart speaker, a smart watch, etc. The terminals and the live streaming system server may be directly or indirectly connected through wired or wireless communication, and this is not limited in the embodiments of this application.

Figure 2:
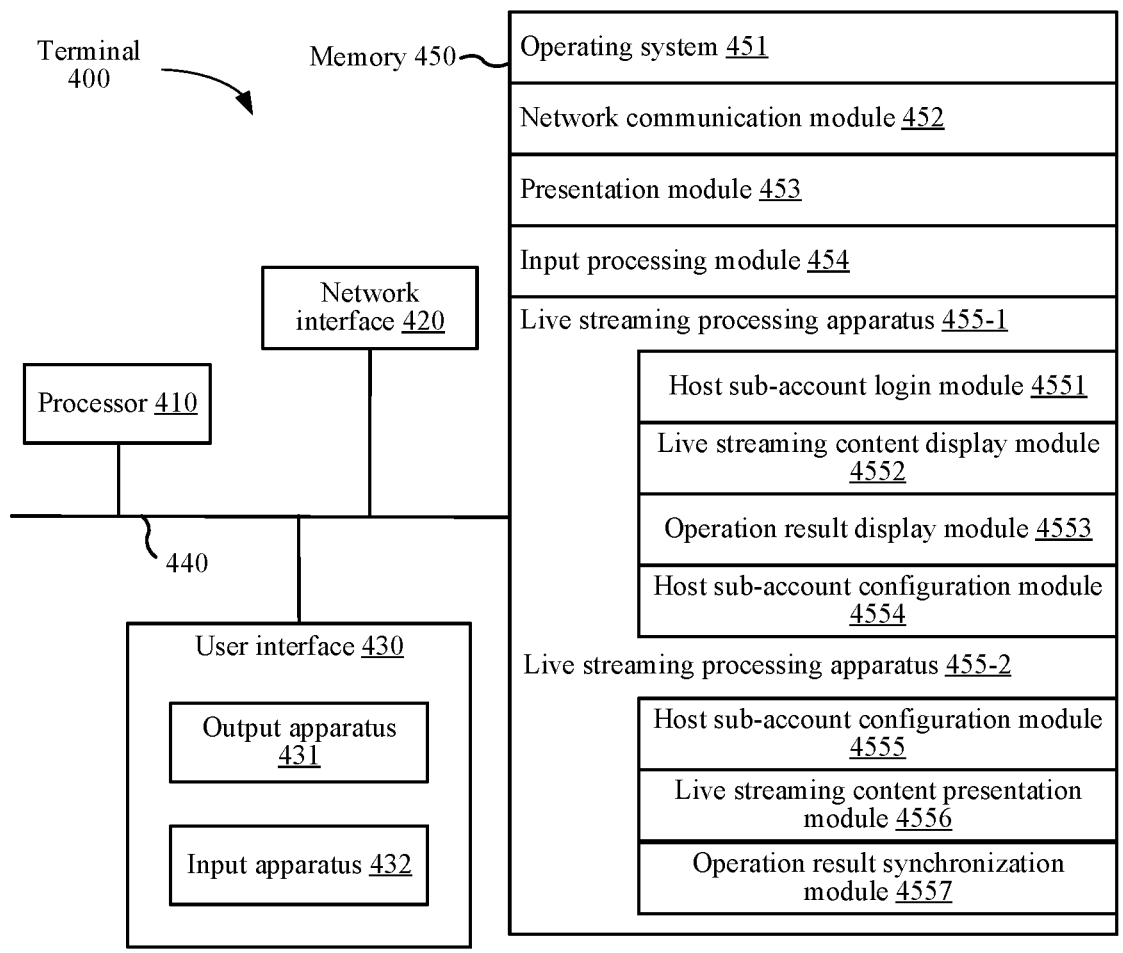
FIG. 2 is a schematic structural diagram of a terminal 400 to which a live streaming processing method according to an embodiment of this application is applied.

Referring to FIG. 2, a schematic structural diagram of a terminal 400 to which a live streaming processing method according to an embodiment of this application is applied is shown. The terminal 400 shown in FIG. 2 includes: at least one processor 410, a memory 450, at least one network interface 420, and a user interface 430. All the components in the terminal 400 are coupled together by a bus system 440. It may be understood that, the bus system 440 is configured to implement connection and communication between the components. In addition to a data bus, the bus system 440 further includes a power bus, a control bus, and a state signal bus. However, for ease of clear description, all types of buses in FIG. 2 are marked as the bus system 440.

The processor 410 may be an integrated circuit chip having a signal processing capability, for example, a general purpose processor, a digital signal processor (DSP), or another programmable logic device (PLD), discrete gate, transistor logical device, or discrete hardware component. The general purpose processor may be a microprocessor, any conventional processor, or the like.

The user interface 430 includes one or a plurality of output apparatuses 431 that enable display of media contents, including one or a plurality of speakers and/or one or a plurality of visual display screens. The user interface 430 further includes one or a plurality of input apparatuses 432, including user interface components that facilitate user input, such as a keyboard, a mouse, a microphone, a touchscreen display, a camera, and other input buttons and controls.

The memory 450 may be a removable memory, a non-removable memory, or a combination thereof. An exemplary hardware device includes a solid state memory, a hard disk drive, an optical disc drive, and the like. The memory 450 includes one or a plurality of storage devices that are physically remote from the processor 410.

The memory 450 includes a volatile memory or a non-volatile memory, or may include a volatile memory and a non-volatile memory. The non-volatile memory may be a Read Only Memory (ROM), and the volatile memory may be a Random Access Memory (RAM). The memory 450 described in the embodiments of this application is to include any other suitable type of memories.

In some embodiments, the memory 450 is capable of storing data to support various operations, and examples of the data include programs, modules, and data structures, or subsets or super-sets thereof, as exemplified below.

An operating system 451 includes a system program configured to process various basic system services and perform a hardware-related task, for example, a framework layer, a core library layer, and a driver layer, and is configured to implement various basic services and process a hardware-related task.

A network communication module 452 is configured to reach another computing device through one or more (wired or wireless) network interfaces 420. Exemplary network interfaces 420 include: Bluetooth, wireless compatible authentication (WiFi), a universal serial bus (USB), and the like.

A display module 453 is configured to display information by using an output apparatus 431 (for example, a display screen or a speaker) associated with one or more user interfaces 430 (for example, a user interface configured to operate a peripheral device and display content and information).

An input processing module 454 is configured to detect one or more user inputs or interactions from one of the one or more input apparatuses 432 and translate the detected input or interaction.

In some embodiments, a live streaming processing apparatus 455-1 provided in the embodiments of this application may be implemented by software, and FIG. 2 shows the live streaming processing apparatus 455-1 stored in the memory 450, which may be software in the form of a program and a plug-in, and include the following software modules: a host sub-account login module 4551, a live streaming content display module 4552, an operation result display module 4553, and a host sub-account configuration module 4554. The live streaming processing device 455-2 provided by the embodiments of this application may be implemented by software. A live streaming processing apparatus 455-2 stored in the memory 450 is shown in FIG. 2, which may be software in the form of a program and a plug-in, and include the following software modules: a host sub-account configuration module 4555, a live streaming content display module 4556, and an operation result synchronization module 4557. The modules are logical, and therefore can be combined randomly or further split according to realized functions. Functions of the modules will be explained below.

The live streaming processing method provided by the embodiments of this application will be described with reference to the exemplary applications and implementations of the terminals provided by the embodiments of this application.

Figure 3A:
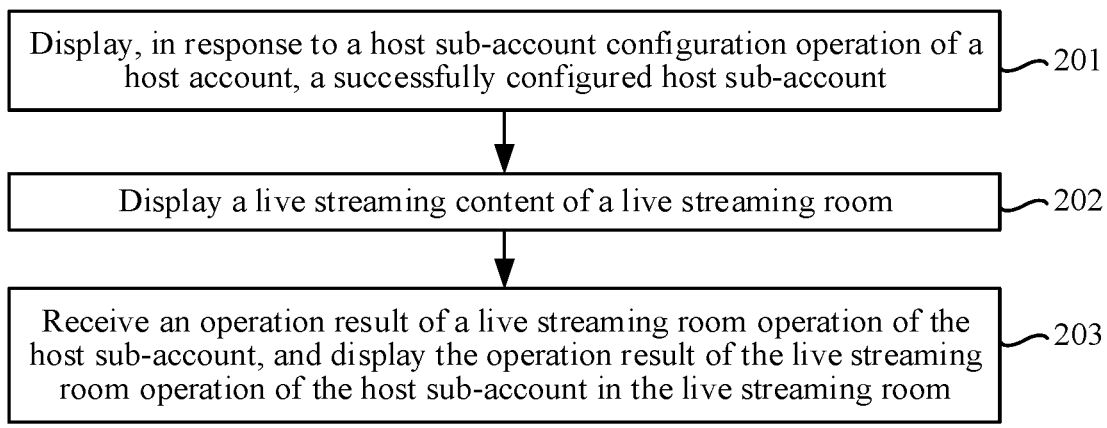
FIG. 3A to FIG. 3E are schematic flowcharts of a live streaming processing method according to an embodiment of this application.

Referring to FIG. 3A, a schematic flowchart of a live streaming processing method according to an embodiment of this application is shown, which will be described with reference to steps 201 to 203 shown in FIG. 3A. The following executive subject is a live streaming client, to which a host account is logged in, in the terminal of FIG. 1.

In step 201, in response to a host sub-account configuration operation of a host account, a successfully configured host sub-account is displayed.

As an example, a host sub-account is configured for the host account of a live streaming room before or during a live streaming. The host sub-account is different from a viewer account of the live streaming room and used for assisting the host account of the live streaming room in operation.

As an example, the live streaming client receives a login operation of the host account in the live streaming room, and a live streaming system server completes a login process and returns a login result to the live streaming client, so that the live streaming client displays a logged-in status of the host account in the live streaming room. After receiving the host sub-account configuration operation of the host account, the live streaming client will request the live streaming system server to configure at least one host sub-account for the host account, and display the successfully configured host sub-account.

In some embodiments, before the displaying a successfully configured host sub-account, the following technical solutions may also be performed: requesting the live streaming system server to configure at least one host sub-account for the host account in at least one of the following manners: requesting, in response to the host sub-account configuration operation of the host account, the live streaming system server to create at least one live streaming client account, and requesting the live streaming system server to configure the created at least one live streaming client account as a host sub-account of the host account; displaying a host sub-account setting page, acquiring, in response to the host sub-account configuration operation of the host account on the host sub-account setting page, a registered live streaming client account in the live streaming system server inputted by the host sub-account configuration operation, and requesting the live streaming system server to configure the registered live streaming client account as a host sub-account of the host account; and displaying at least one registered live streaming client account of the live streaming system server, acquiring, in response to the host sub-account configuration operation of the host account, at least one registered live streaming client account selected by the host sub-account configuration operation, and requesting the live streaming system server to configure the selected at least one registered live streaming client account as a host sub-account of the host account.

As an example, before responding to the host sub-account configuration operation of the host account, there are at least the following three manners to request the live streaming system server to configure at least one host sub-account for the host account. For example, the host sub-account configuration operation of the host account is received, and the live streaming system server is requested to create at least one live streaming client account. The created live streaming client account is a new account, and an account and a password matching each other are generated during the creation of the new account. The live streaming system server is requested to configure the created at least one live streaming client account as a host sub-account of the host account. An operation permission of the generated new account is configured, and the operation permission specifies a specific operation type and operation time when the corresponding account performs a management operation. For example, in some implementations, it may be unnecessary for the live streaming system server to generate a new live streaming client account and grant permissions to the new live streaming client account to become the host sub-account. An operation that triggers a corresponding function interface is received through a human-machine interaction interface to display the host sub-account setting page. The operation that triggers the corresponding function interface here may be a voice instruction or a touchscreen operation for a control. In response to the host sub-account configuration operation of the host account on the host sub-account setting page, the live streaming client account inputted by the host sub-account configuration operation is transmitted to the live streaming system server, so that the live streaming system server configures the inputted live streaming client account as the host sub-account of the host account. The inputted live streaming client account is a live streaming client account that has been registered and existed in the live streaming system server. A difference from the above implementation is that the live streaming system server does not need to generate a new account, but only needs to configure an operation permission for the received registered live streaming client account. The operation permission specifies a specific operation type and operation time when the corresponding account performs a management operation. For example, in some implementations, it may be unnecessary to perform an inputting process for a certain registered live streaming client account, and the function of the host sub-account configuration operation is selecting at least one registered live streaming client account from the displayed plurality of registered live streaming client accounts, and transmitting the selected at least one registered live streaming client account to the live streaming system server. The live streaming system server does not need to generate a new account, but only needs to configure an operation permission for the received registered live streaming client account. The operation permission specifies a specific operation type and operation time when the corresponding account performs a management operation. A difference from the above implementation is different types of the host sub-account configuration operation, the former is an input operation for a specific account, and the latter is a selecting operation from a plurality of accounts.

In some embodiments, the above displaying at least one registered live streaming client account of the live streaming system server may be realized by the following technical solutions: acquiring the registered live streaming client account in any of the following manners, and displaying the acquired registered live streaming client account: querying a plurality of registered live streaming client accounts that have interacted with the host account, and displaying, in descending order of the number of interactions, the plurality of live streaming client accounts obtained by querying; and querying a plurality of registered live streaming client accounts that have once been configured as host sub-accounts, and displaying, in descending order of collaboration parameters, the plurality of live streaming client accounts obtained by querying; wherein the collaboration parameter includes one of the following: the number of operations of the host sub-account in the participated live streaming; and an online duration of the host sub-account in the participated live streaming.

As an example, if the implementation of selecting, from at least one registered live streaming client account, a registered live streaming client account that needs to be configured as the host sub-account is adopted, it is necessary to acquire and display at least one registered live streaming client account for selection. During implementation of the embodiments of this application, the applicant finds that randomly displaying at least one registered live streaming client account as a candidate for selection is not necessarily capable of covering a sub-account object that satisfies the host. Exhausting all the registered live streaming client accounts is difficult, and therefore, some registered live streaming client accounts may be accurately selected as candidates for selection. There are a plurality of live streaming client accounts that have interacted with the host account, and the plurality of live streaming client accounts obtained by querying are displayed in descending order of the number of interactions. The number of interactions may be the number of comments or the number of likes. For the interactions, a more restrictive method may be adopted, that is, only two-way interactions count. For example, when a live streaming client account comments on the host, and the host responds to the comment in any form and records the response in live streaming data, it is considered that an interaction has occurred. In another implementation, a plurality of live streaming client accounts that have been configured as the host sub-accounts, that is, the former host sub-accounts of the host account that now do not belong to the corresponding host account are queried. The plurality of live streaming client accounts (which used to be the host sub-accounts of the host account) obtained by querying are displayed in descending order of collaboration parameters. The collaboration parameter may be the number of operations of the host sub-account in the participated live streaming; or an online duration of the host sub-account in the participated live streaming. The collaboration parameter is used for representing the degree of collaboration of the host account corresponding to the host sub-account.

In step 202, a live streaming content of the live streaming room is displayed.

As an example, the live streaming client to which the host account is logged in collects the performance of the host to form a live streaming content, and displays the live streaming content of the live streaming room in the live streaming client.

In step 203, an operation result of a live streaming room operation of the host sub-account is received, and the operation result of the live streaming room operation of the host sub-account is displayed in the live streaming room.

As an example, the configuration of the host sub-account has been completed at this time, and the host sub-account has the permission to manage the live streaming room. Therefore, when receiving live streaming room operation data corresponding to the live streaming room operation of the host sub-account, the live streaming system server will return the operation result to the live streaming client to which the host account is logged in and a live streaming client of a viewer.

In some embodiments, the following technical solutions may further be implemented: displaying an editing page, the editing page including the host sub-account that has been configured for the host account and an account attribute; requesting, in response to a delete operation for any host sub-account, the live streaming system server to delete a target host sub-account at which the delete operation is aimed and a corresponding account attribute, and displaying, after the deletion, prompt information prompting that the target host sub-account has been deleted; and requesting, in response to an attribute editing operation for any host sub-account, the live streaming system server to update a new account attribute submitted by the attribute editing operation for the target host sub-account, and displaying, after the update, prompt information prompting that the new account attribute has been updated to.

As an example, an editing operation may be performed for the host sub-account, which is realized by the editing page. The existing host sub-account and an account attribute corresponding to each host sub-account are displayed in the editing page. In response to the delete operation, the live streaming system server is requested to delete the target host sub-account and the account attribute thereof. The target host sub-account is selected on the editing page. If the host sub-account is selected from the registered live streaming client accounts and then configured, the deletion refers to deleting a binding relationship between the live streaming client account and the host sub-account, that is, deleting the live streaming client account from the host sub-account. If the sub-account is registered in the live streaming system server and is specially used for managing the live streaming room, the deletion refers to that the live streaming system server deletes the host sub-account, which is equivalent to cancellation of the host sub-account.

As an example, similar to the logic of responding to the delete operation, it is also possible to respond to a change operation. In response to a change operation for any created host sub-account, the live streaming system server is requested to modify the target host sub-account targeted by the change operation to a live streaming client account in the change operation, and display prompt information prompting that the corresponding host sub-account has been changed into the live streaming client account in the change operation. This is equivalent to realizing the transfer of permissions, that is, transferring the permissions of the host sub-account from the target host sub-account to the live streaming client account in the change operation.

As an example, in response to an attribute editing operation, the live streaming system server is requested to update a new account attribute submitted by the attribute editing operation for the target host sub-account. The target host sub-account is selected on the editing page, and the new account attribute is a new permission. In an actual application process, the applicant finds that classification of permission levels for the host sub-accounts can achieve a more efficient management result. That is, different host sub-accounts are assigned with different operation permissions, and the operation permissions of the host sub-accounts may be mutually exclusive or overlap each other. Therefore, when the attribute editing operation is responded to, the permission corresponding to the host sub-account may be adjusted, and the new permission obtained after adjustment may be synchronized to each host sub-account end.

As an example, the live streaming client to which the host account is logged in may still update the attribute of the host sub-account during the live streaming, that is, performing the delete operation, the change operation, and the attribute editing operation. The live streaming system server responds to the delete operation, the change operation, and the attribute editing operation of the host account to delete, change, or update the attribute of the host sub-account, and synchronize the attribute to the client of each host sub-account.

Figure 3B:
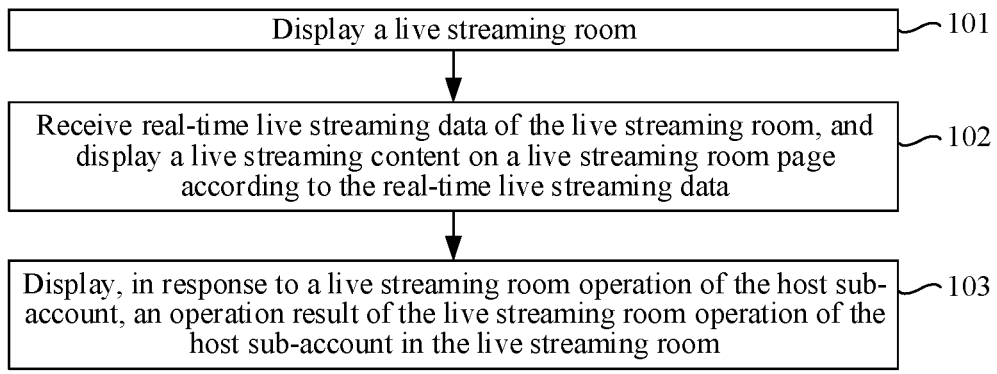

Referring to FIG. 3B, a schematic flowchart of a live streaming processing method according to an embodiment of this application is shown, which will be described with reference to steps 101 to 103 shown in FIG. 3B. The following executive subject is a live streaming client, to which a host sub-account is logged in, in the terminal of FIG. 1.

In step 101, a live streaming room is displayed. In some embodiments, the live stream room has an associated host account, a host sub-account and a plurality of viewer accounts.

As an example, the host sub-account is in a logged-in status in the live streaming room, the host sub-account is different from a viewer account of the live streaming room and used for assisting a host account of the live streaming room in operation. The host sub-account is configured for the host account of the live streaming room before or during the live streaming in the live streaming room.

As an example, in response to a login operation of the host account, a list of live streaming rooms is displayed. In response to a selection operation of the host account on the list of live streaming rooms, the selected live streaming room is entered. An access operation of the host sub-account for the selected live streaming room is received, and a login request is transmitted to a live streaming system server. The live streaming system server returns a login result, and the logged-in status of the host sub-account in the live streaming room is displayed on the live streaming client. The host sub-account is configured for the host account of the live streaming room before the live streaming of the live streaming room starts, and therefore has a corresponding configured permission.

In some embodiments, during displaying of the live streaming room, a name of the host sub-account, for example, Zhang San, and login identity prompt information are displayed to prompt that "the login identity is the host sub-account." The login identity prompt information is used for prompting that the live streaming room is logged in to with the host sub-account, and the login identity prompt information and the name of the host sub-account belong to subordinate concepts of the logged-in status.

In some embodiments, when the login identity prompt information is displayed, the following technical solutions may further be performed: displaying account attribute prompt information; the account attribute prompt information being used for prompting an account attribute of the host sub-account; and the account attribute including at least one of the following: operation permissions that the host sub-account has in the live streaming room; and a validity period of the host sub-account.

As an example, the host sub-account has the permission to operate in the live streaming room. Different host sub-accounts are assigned different operation permissions. The operation permissions of the host sub-accounts may be mutually exclusive or overlap each other. Therefore, during the display of the login identity prompt information, more detailed permission prompt information will further be displayed for prompting the operation permissions possessed by the host sub-account and the validity period of the host sub-account.

In step 102, real-time live streaming data of the live streaming room is received, and a live streaming content is displayed on a live streaming room page according to the real-time live streaming data.

As an example, the real-time live streaming data is collected after logging in to the live streaming room based on the host account.

In step 103, in response to a live streaming room operation of the host sub-account, an operation result of the live streaming room operation of the host sub-account is displayed in the live streaming room. In some embodiments, the operation result of the live streaming room operation updates the live streaming content on the live streaming room page.

As an example, during the live streaming of the live streaming room, the live streaming room operation of the host sub-account is received, and live streaming room operation data corresponding to the live streaming room operation of the host sub-account is transmitted to the live streaming system server. The live streaming system server returns a result of the live streaming room operation of the host sub-account to the live streaming client, and the corresponding operation result is displayed in the live streaming room.

In some embodiments, when the host sub-account lacks the permission to perform the live streaming room operation, invalid operation prompt information may be displayed. The invalid operation prompt information is used for prompting a permission required to perform the live streaming room operation. A permission request is transmitted to the host account in response to a permission application operation of the host sub-account, or a permission request is automatically transmitted to the host account. The live streaming room operation of the host sub-account is performed when the required permission is obtained.

As an example, the live streaming room operation initiated by the host sub-account is mute, but the host sub-account does not have the permission to mute, and invalidity prompt information is displayed to remind that the host sub-account does not possess the permission to mute, and that the host sub-account has the permission to issue a link in the live streaming room. The permission application operation may be a voice operation or a touchscreen operation. A permission request is transmitted to the host account in response to a permission application operation of the host sub-account, or a permission request is automatically transmitted to the host account. The host account receives the permission request. The permission request carries the permission that the host sub-account needs to acquire, for example, the permission to mute. The host account opens the permission that the host sub-account needs to acquire carried in the permission request, and when the required permission is obtained, the live streaming room operation of the host sub-account is performed.

In some embodiments, when the host sub-account meets an account recovery condition, account recovery prompt information is displayed. The account recovery condition includes that: an operation time of the live streaming room operation of the host sub-account exceeds a validity period of the host sub-account operation; or an operation time of the live streaming room operation of the host sub-account does not exceed the validity period of the host sub-account operation, but an upper limit of the number of operations within the validity period is reached. A validity period renewal request is transmitted to the host account in response to a validity period renewal application operation of the host sub-account, or a validity period renewal request is automatically transmitted to the host account. The validity period renewal request is used for requesting to extend the validity period of the host sub-account, or increasing the upper limit of the number of operations within the validity period of the host account. The type of the upper limit of the number of operations includes: the upper limit of the number of daily operations within the validity period, and the upper limit of the cumulative number of operations within the validity period.

As an example, the host sub-account has a validity period. When the host sub-account exceeds the validity period, the account recovery prompt information is displayed to prompt identity relief of the host sub-account. The account recovery condition may be that the operation time exceeds the validity period of the corresponding operation, or when the number of operations reaches the upper limit, after or before the account recovery prompt information is displayed, a validity period renewal request may be actively or automatically transmitted to the host account, thereby extending the validity period.

In some embodiments, automatic update prompt information of an account attribute of the host sub-account is displayed. The automatic update prompt information is used for prompting that the account attribute of the host sub-account has been updated. An update value of the account attribute is in positive correlation with a collaboration parameter of the host sub-account, and the collaboration parameter includes one of the following: the number of operations of the host sub-account in the participated live streaming; and an online duration of the host sub-account in the participated live streaming.

As an example, the update value of the account attribute is used for presenting at least one of the following: an operation permission possessed by the host sub-account in the live streaming room; and the validity period of the host sub-account. For example, the update value is a level of the operation permission. The level of the operation permission is in positive correlation with the number of operations of the host sub-account in the participated live streaming. The level of the operation permission is in positive correlation with online duration of the host sub-account in the participated live streaming. A higher level of operation permission indicates a greater operation permission.

As an example, in order to meet a configuration requirement of the host for the host sub-account during the live streaming, the attribute of the host sub-account may be controlled through the live streaming system server.

As an example, the automatic update of the account attribute is implemented by monitoring data in real time by the live streaming system server. For example, the live streaming system server monitors the number of operations of a certain host sub-account in the participated live streaming and the online duration in the participated live streaming, and obtains pre-set account attributes that match the number of operations in the live streaming and the online duration in the participated live streaming. Different account attributes represent that the host sub-account has different permissions, which is equivalent to the process of automatically controlling the host sub-account to elevate the permission in the background.

As an example, the live streaming client to which the host account is logged in may still update the attribute of the host sub-account during the live streaming, that is, performing the delete operation, the change operation, and the attribute editing operation. The live streaming system server responds to the delete operation, the change operation, and the attribute editing operation of the host account to delete, change, or update the attribute of the host sub-account, and synchronize the attribute to the client of each host sub-account.

Figure 3C:
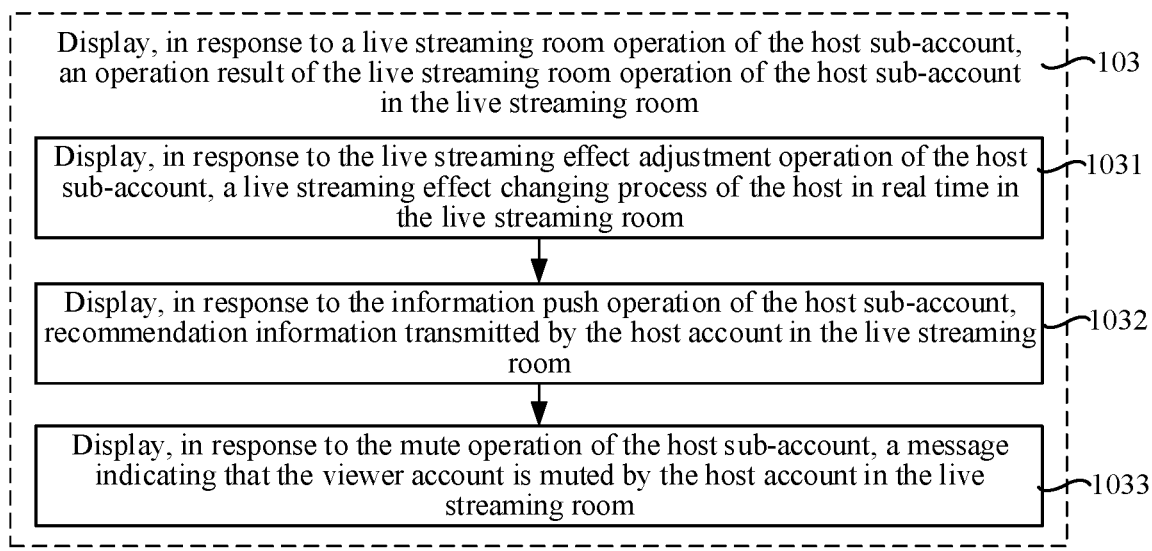

Referring to FIG. 3C, an exemplary schematic flowchart of a live streaming processing method according to an embodiment of this application is shown. The displaying, in response to a live streaming room operation of the host sub-account, an operation result of the live streaming room operation of the host sub-account in the live streaming room in step 103 may be implemented by performing at least one of steps 1031 to 1033.

As an example, the live streaming room operation of the host sub-account includes at least one of the following: a live streaming effect adjustment operation of the host sub-account, and an information push operation and a mute operation of the host sub-account.

In step 1031, a live streaming effect changing process of the host is displayed in real time in the live streaming room in response to the live streaming effect adjustment operation of the host sub-account.

In step 1032, recommendation information transmitted by the host account is displayed in the live streaming room in response to the information push operation of the host sub-account.

In step 1033, a message indicating that the viewer account is muted by the host account is displayed in the live streaming room in response to the mute operation of the host sub-account.

As an example, a live streaming effect changing process of the host is displayed in real time in the live streaming room in response to the live streaming effect adjustment operation of the host sub-account. Recommendation information transmitted by the host account is displayed in the live streaming room in response to the information push operation of the host sub-account. A message indicating that the viewer account is muted by the host account is displayed in the live streaming room in response to the mute operation of the host sub-account. Operation results of the operations may be synchronized to the client of the host account, the client of another host sub-account, and all viewer clients.

In some embodiments, when responding to the live streaming room operation of the host sub-account, live streaming room operation data corresponding to the live streaming room operation of the host sub-account is transmitted to the live streaming system server. The live streaming room operation data is used for enabling the live streaming system server to modify a source account of an operation result of the live streaming room operation into the host account, and transmit the modified source account to a live streaming client of the viewer account in the live streaming room.

As an example, the operation result of the host sub-account may be expressed by an identity different from the host account. That is, the viewer may perceive that an operation result of a certain operation of the host sub-account is implemented through another account that is different from the host account. In order to allow the viewer to have special interaction experience with the host, the viewer may be provided with live streaming experience in which existence of the host sub-account cannot be perceived. That is, at the technical level, the live streaming room operation data corresponding to the live streaming room operation of the host sub-account is transmitted to the live streaming system server. The live streaming room operation data is used for enabling the live streaming system server to modify a source account of an operation result of the live streaming room operation into the host account, and transmit the modified source account to a live streaming client of the viewer account in the live streaming room.

In some embodiments, the host sub-account is automatically configured by the live streaming system server in at least one of the following manners: automatically creating a new live streaming client account during creation of the host account by the live streaming system server, and configuring the automatically created live streaming client account as the host sub-account of the host account; and automatically creating a new live streaming client account by the live streaming system server when a quantity of host sub-accounts that have been configured for the host account is lower than a minimum quantity required for managing the live streaming room, and configuring the automatically created live streaming client account as the host sub-account of the host account.

As an example, in the above embodiment, two methods of automatically configuring the host sub-account are adopted. The first method of automatically configuring the host sub-account is configuring, when creating a host account, a corresponding quantity of host sub-accounts according to a level of the host account required to be created. For example, if a host applies to create a level-2 host account, the server, when creating a level-2 host account, will automatically create host sub-accounts in a quantity matching the level-2 host account at the same time, each host sub-account having a corresponding permission. This is equivalent to creating a set of host sub-accounts at the same time. The second method of automatically configuring the host sub-account is performed for the existing host account. When the quantity of host sub-accounts that have been configured for the host account is lower than the minimum quantity required for managing the live streaming room, for example, the quantity of operations that need to be performed per unit time in historical live streaming is counted, and in combination with operation data (a historical data experience value) that can be completed per unit time for each host sub-account, it is determined whether the assigned host sub-account meets the minimum quantity for managing the live streaming room, and if not, the live streaming system server automatically creates a new live streaming client account and configures it as a host sub-account of the host account until the host sub-accounts of the host account meet the minimum quantity for managing the live streaming room.

As an example, the configuring methods of the operation permission and the operation validity period may be uniformly configuring the default operation permission and operation validity period, or differentially configuring the operation permission and operation validity period, that is, forming different types of host sub-accounts, such as a long-term effective host sub-account, a temporary host sub-account, and high/low-level sub-accounts. After being created, the host sub-account may be shared by the host account with an assistant by, for example, QR code sharing.

Figure 3D:
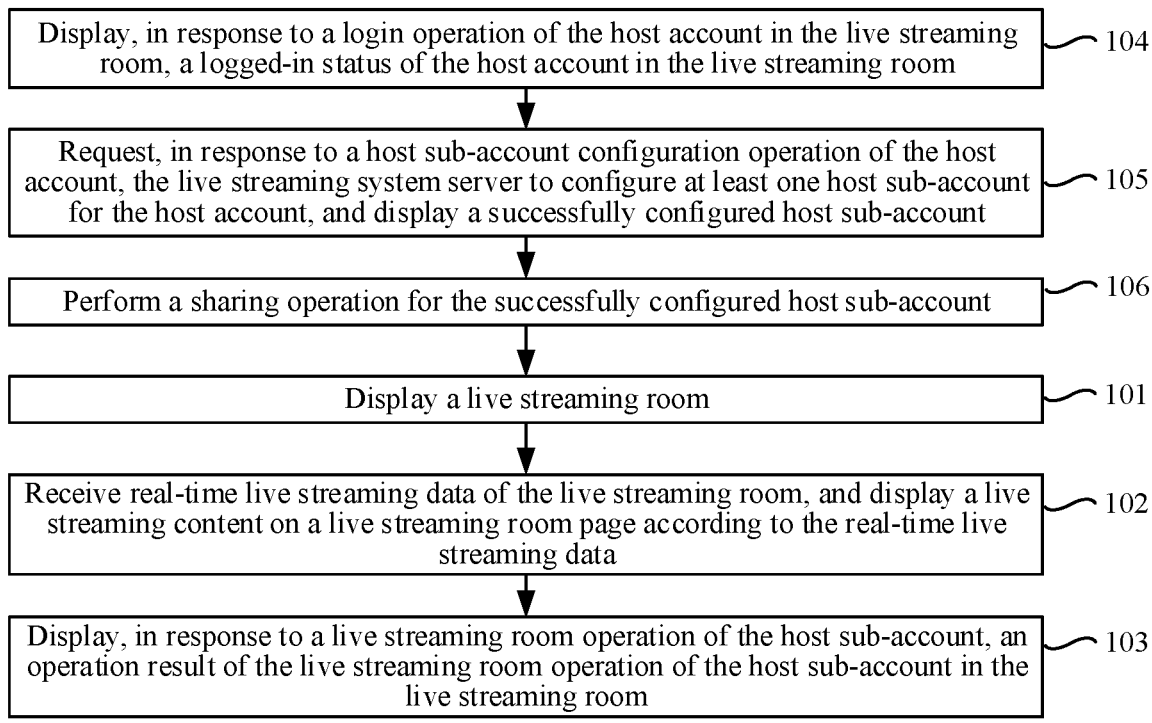

Referring to FIG. 3D, a schematic flowchart of a live streaming processing method according to an embodiment of this application is shown. Before step 101 is performed, steps 104 to 106 may further be performed.

In step 104, a logged-in status of the host account in the live streaming room is displayed in response to a login operation of the host account in the live streaming room.

As an example, the host sub-account is configured by the live streaming system server for the host account in response to a request of the host account.

In step 105, the live streaming system server is requested to configure at least one host sub-account for the host account in response to a host sub-account configuration operation of the host account, and a successfully configured host sub-account is displayed.

In step 106, a sharing operation is performed for the successfully configured host sub-account.

As an example, the sharing operation for the successfully configured host sub-account is performed on the target live streaming client account. Performing the sharing operation for the successfully configured host sub-account may be forwarding a message or graphic code to the assistant (using the target live streaming client account), so that the assistant can use this host sub-account and exercise the permission of the host sub-account within the validity period.

Figure 3E:
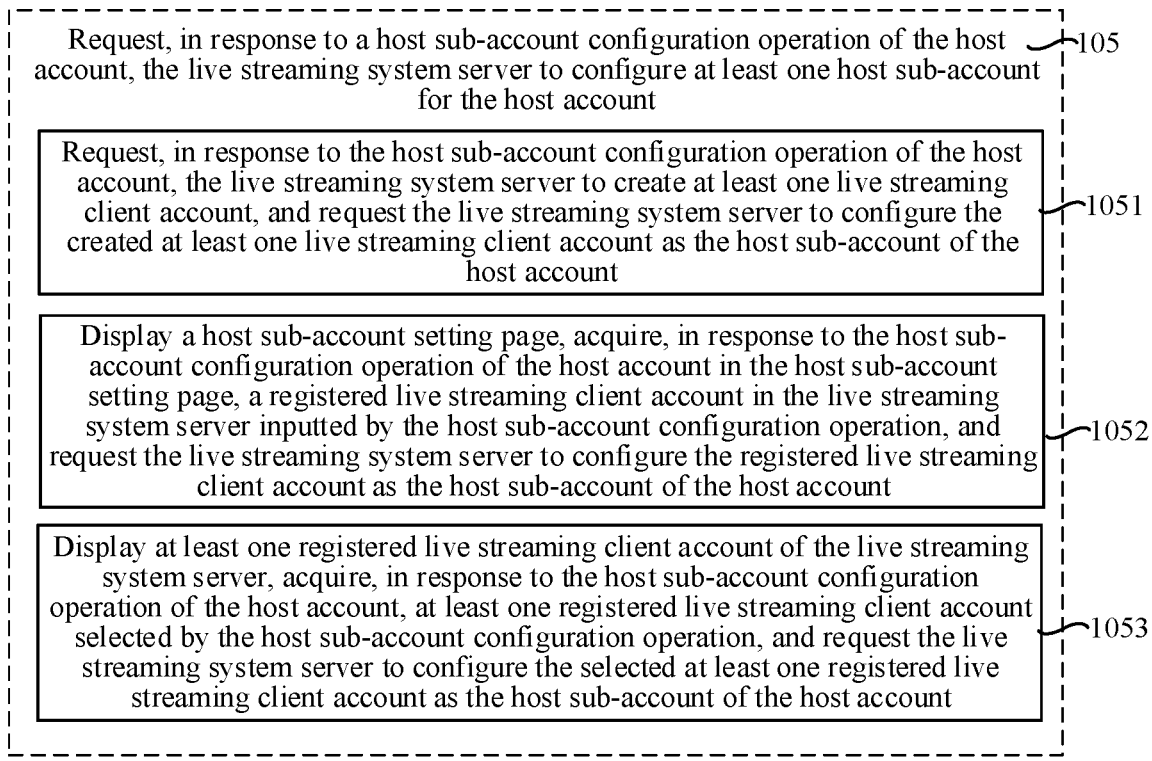

In some embodiments, referring to FIG. 3E, an exemplary schematic flowchart of a live streaming processing method according to an embodiment of this application is shown. The requesting, in response to a host sub-account configuration operation of the host account, the live streaming system server to configure at least one host sub-account for the host account in step 105 may be achieved by performing at least one of steps 1051 to 1053.

In step 1051, the live streaming system server is requested to create at least one live streaming client account in response to the host sub-account configuration operation of the host account, and the live streaming system server is requested to configure the created at least one live streaming client account as the host sub-account of the host account.

As an example, the live streaming system server may create a set of host sub-accounts, and each host sub-account in the set is configured with an operation permission, a validity period, and a quantity of host sub-accounts.

As an example, after the host sub-account configuration operation of the host account is received, the live streaming system server is requested to create at least one live streaming client account. The created live streaming client account is a new account, and an account and a password matching each other are generated during the creation of the new account. The live streaming system server is requested to configure the created at least one live streaming client account as the host sub-account of the host account, and configure an operation permission of the generated new account. The operation permission specifies a specific operation type and operation time when the corresponding account performs a management operation.

In step 1052, a host sub-account setting page is displayed, a registered live streaming client account in the live streaming system server inputted by the host sub-account configuration operation is acquired in response to the host sub-account configuration operation of the host account in the host sub-account setting page, and the live streaming system server is requested to configure the registered live streaming client account as the host sub-account of the host account.

As an example, it may be unnecessary for the live streaming system server to generate a new live streaming client account and grant permissions to become the host sub-account. An operation that triggers a corresponding function interface is received through a human-machine interaction interface to display the host sub-account setting page. The operation that triggers the corresponding function interface here may be a voice instruction or a touchscreen operation for a control. In response to the host sub-account configuration operation of the host account on the host sub-account setting page, the live streaming client account inputted by the host sub-account configuration operation is transmitted to the live streaming system server, so that the live streaming system server configures the inputted live streaming client account as the host sub-account of the host account. The inputted live streaming client account is a live streaming client account that has been registered and existed in the live streaming system server. A difference from the above implementation is that the live streaming system server does not need to generate a new account, but only needs to configure an operation permission for the received registered live streaming client account. The operation permission specifies a specific operation type and operation time when the corresponding account performs a management operation.

In step 1053, at least one registered live streaming client account of the live streaming system server is displayed, at least one registered live streaming client account selected by the host sub-account configuration operation is acquired in response to the host sub-account configuration operation of the host account, and the live streaming system server is requested to configure the selected at least one registered live streaming client account as the host sub-account of the host account.

As an example, it may be unnecessary to perform an inputting process for a certain registered live streaming client account, and the function of the host sub-account configuration operation is selecting at least one registered live streaming client account from the displayed plurality of registered live streaming client accounts, and transmitting the selected at least one registered live streaming client account to the live streaming system server. The live streaming system server does not need to generate a new account, but only needs to configure an operation permission for the received registered live streaming client account. The operation permission specifies a specific operation type and operation time when the corresponding account performs a management operation. A difference from the above implementation is different types of the host sub-account configuration operation, the former is an input operation for a specific account, and the latter is a selecting operation from a plurality of accounts.

As an example, the live streaming client account may be a user account specially registered by the user in a live streaming system, or may be a multiplexed third-party system account (a third-party system account such as a social account) that can log in to the live streaming system.

In some embodiments, the above displaying at least one registered live streaming client account of the live streaming system server may be realized by the following technical solutions: acquiring the registered live streaming client account in any of the following manners, and displaying the acquired registered live streaming client account: querying a plurality of registered live streaming client accounts that have interacted with the host account, and displaying, in descending order of the number of interactions, the plurality of live streaming client accounts obtained by querying; and querying a plurality of registered live streaming client accounts that have once been configured as host sub-accounts, and displaying, in descending order of collaboration parameters, the plurality of live streaming client accounts obtained by querying; wherein the collaboration parameter includes one of the following: the number of operations of the host sub-account in the participated live streaming; and an online duration of the host sub-account in the participated live streaming.

As an example, when candidate live streaming client accounts are displayed, a suggested configuration of the quantity of live streaming client accounts may be further displayed. The suggested configuration may be specifically that the quantity of operations that need to be completed per unit time in each live streaming is calculated according to historical live streaming data, and according to a quantity of operations that can be completed per unit time for each host sub-account, a minimum quantity of host sub-accounts that can effectively manage the live streaming room may be calculated based on a preset rule or a machine learning model and then displayed. An operation permission and a validity period of the host sub-account that are configured by default are further displayed at the same time. While displaying, a modification interface is opened to support subsequent modification of the host account.

In some embodiments, the following technical solutions may further be implemented: displaying an editing page, the editing page including the host sub-account that has been configured for the host account and an account attribute; requesting, in response to a delete operation for any host sub-account, the live streaming system server to delete a target host sub-account at which the operation is aimed and a corresponding account attribute, and displaying, after the deletion, prompt information prompting that the target host sub-account has been deleted; and requesting, in response to an attribute editing operation for any host sub-account, the live streaming system server to update a new account attribute submitted by the attribute editing operation for the target host sub-account, and displaying, after the update, prompt information prompting that the new account attribute has been updated to.

As an example, an editing operation may be performed for the host sub-account, which is realized by the editing page. The existing host sub-account and an account attribute corresponding to each sub-account are displayed in the editing page. In response to the delete operation, the live streaming system server is requested to delete the target host sub-account and the account attribute thereof. The target host sub-account is selected on the editing page. If the sub-account is selected from the registered live streaming client accounts and then configured, the deletion refers to deleting a binding relationship between the live streaming client account and the host sub-account, that is, deleting the live streaming client account from the host sub-account. If the sub-account is registered in the live streaming system server and is specially used for managing the live streaming room, the deletion refers to that the live streaming system server deletes the host sub-account, which is equivalent to cancellation of the host sub-account.

As an example, similar to the logic of responding to the delete operation, it is also possible to respond to a change operation. In response to a change operation for any created host sub-account, the live streaming system server is requested to modify the target host sub-account targeted by the change operation to a live streaming client account in the change operation, and display prompt information prompting that the corresponding host sub-account has been changed into the live streaming client account in the change operation. This is equivalent to realizing the transfer of permissions, that is, transferring the permissions of the sub-account from the target host sub-account to the live streaming client account in the change operation.

As an example, in response to an attribute editing operation, the live streaming system server is requested to update a new account attribute submitted by the attribute editing operation for the target host sub-account. The target host sub-account is selected on the editing page, and the new account attribute is a new permission. In an actual application process, the applicant finds that classification of permission levels for the host sub-accounts can achieve a more efficient management result. That is, different host sub-accounts are assigned with different operation permissions, and the operation permissions of the host sub-accounts may be mutually exclusive or overlap each other. Therefore, when the attribute editing operation is responded to, the permission corresponding to the host sub-account may be adjusted, and the new permission obtained after adjustment may be synchronized to each host sub-account end.

As an example, the live streaming client to which the host account is logged in may still update the attribute of the host sub-account during the live streaming, that is, performing the delete operation, the change operation, and the attribute editing operation. The live streaming system server responds to the delete operation, the change operation, and the attribute editing operation of the host account to delete, change, or update the attribute of the host sub-account, and synchronize the attribute to the client of each host sub-account for displaying.

Figure 4:
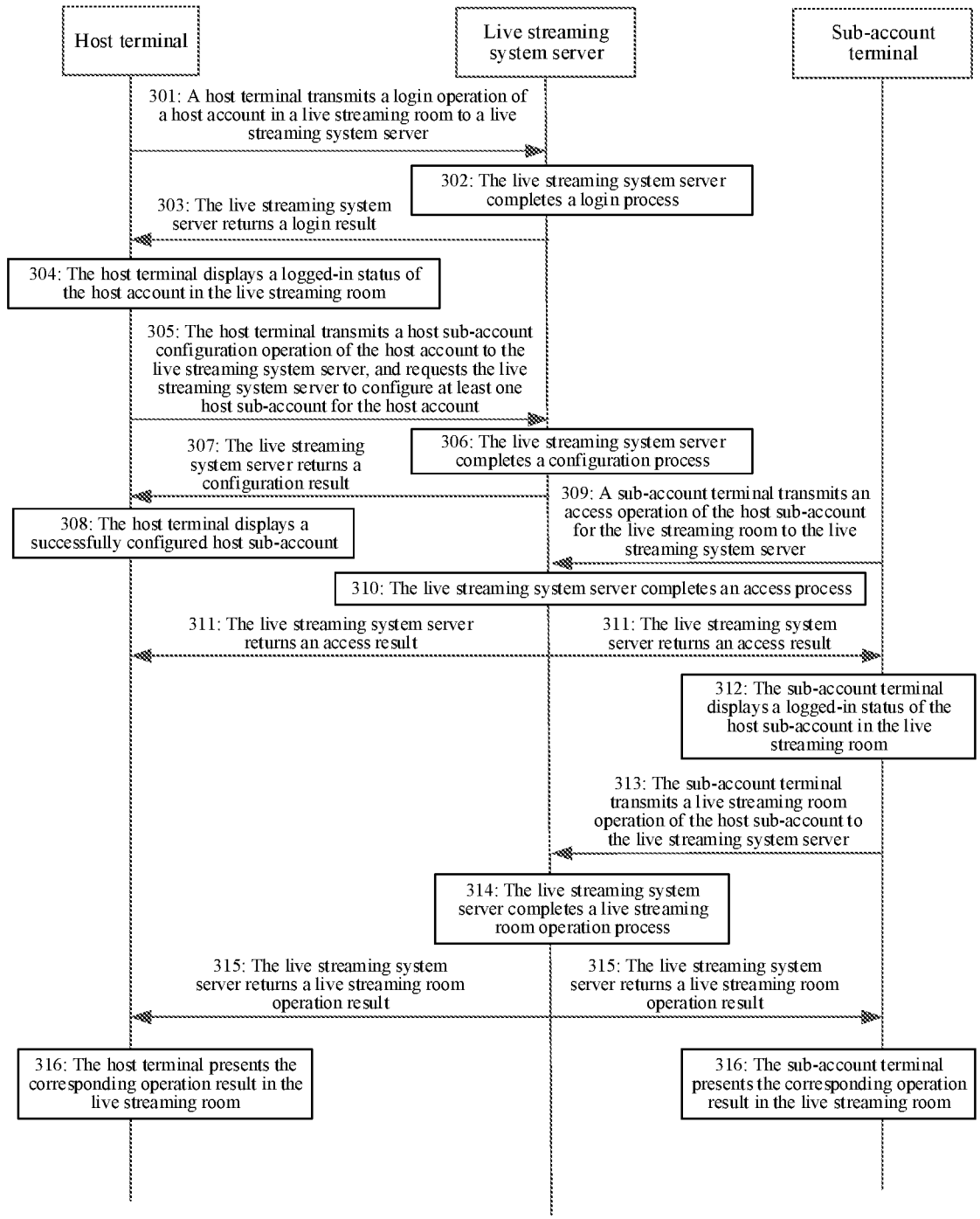
FIG. 4 is an exemplary schematic flowchart of a live streaming processing method according to an embodiment of this application.

Referring to FIG. 4, a schematic interaction flowchart of a live streaming processing method according to an embodiment of this application is shown. 301: A host terminal transmits a login operation of a host account in a live streaming room to a live streaming system server. 302: The live streaming system server completes a login process. 303: The live streaming system server returns a login result. 304: The host terminal displays a logged-in status of the host account in the live streaming room. 305: The host terminal transmits a host sub-account configuration operation of the host account to the live streaming system server, and requests the live streaming system server to configure at least one host sub-account for the host account. 306: The live streaming system server completes a configuration process. 307: The live streaming system server returns a configuration result. 308: The host terminal displays a successfully configured host sub-account. 309: A sub-account terminal transmits an access operation of the host sub-account for the live streaming room to the live streaming system server. 310: The live streaming system server completes an access process. 311: The live streaming system server returns an access result. 312: The sub-account terminal displays a logged-in status of the host sub-account in the live streaming room. 313: The sub-account terminal transmits a live streaming room operation of the host sub-account to the live streaming system server. 314: The live streaming system server completes a live streaming room operation process. 315: The live streaming system server returns a live streaming room operation result. 316: The sub-account terminal displays the corresponding operation result in the live streaming room.

Next, an exemplary application of the live streaming processing method according to an embodiment of this application in a practical application scenario will be described.

In some embodiments, a live streaming scenario may be a shopping live streaming scenario. The shopping live streaming scenario includes a host terminal, a sub-account terminal, and a viewer terminal. A host account performs live streaming through the host terminal, a host sub-account assists a host to manage a live streaming room through the sub-account terminal, and a viewer watches a live streaming content through the viewer terminal. The host terminal requests to configure the host sub-account before starting the live streaming, and transmits the configuration request to a live streaming system server. The live streaming system server, when receiving the configuration request, assigns a corresponding permission to the host sub-account, and displays an identity prompt of the host sub-account on the sub-account terminal to which the host sub-account is logged in. During the live streaming, a live streaming room operation request is transmitted to the live streaming system server through the sub-account terminal to which the host sub-account is logged in, and an operation result is synchronized to the terminals (the host terminal, the sub-account terminal, and the viewer terminal) in the live streaming room.

Figure 5A:
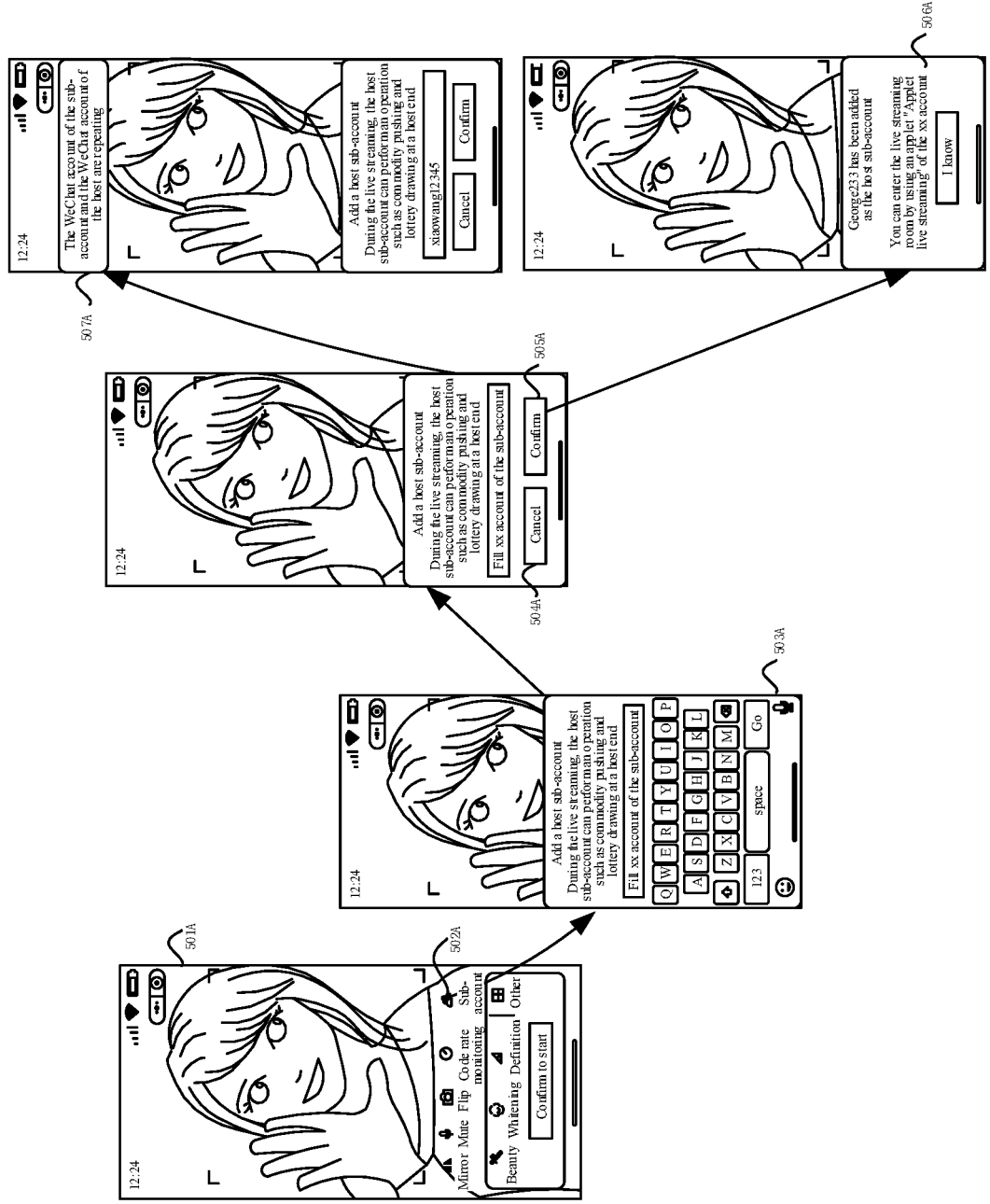
FIG. 5A to FIG. 5F are schematic interface diagrams of a live streaming processing method according to an embodiment of this application.
Figure 5B:
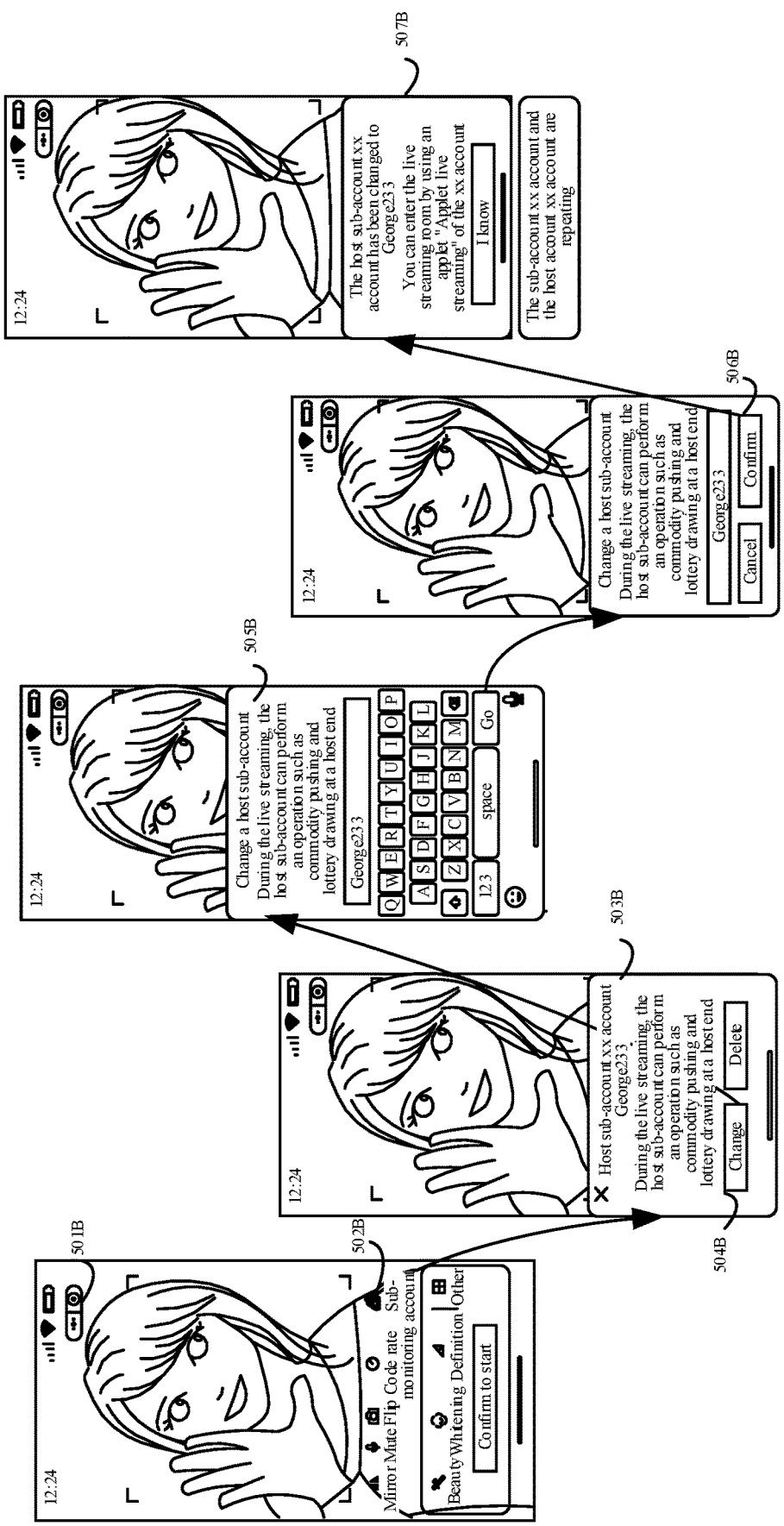
Figure 5C:
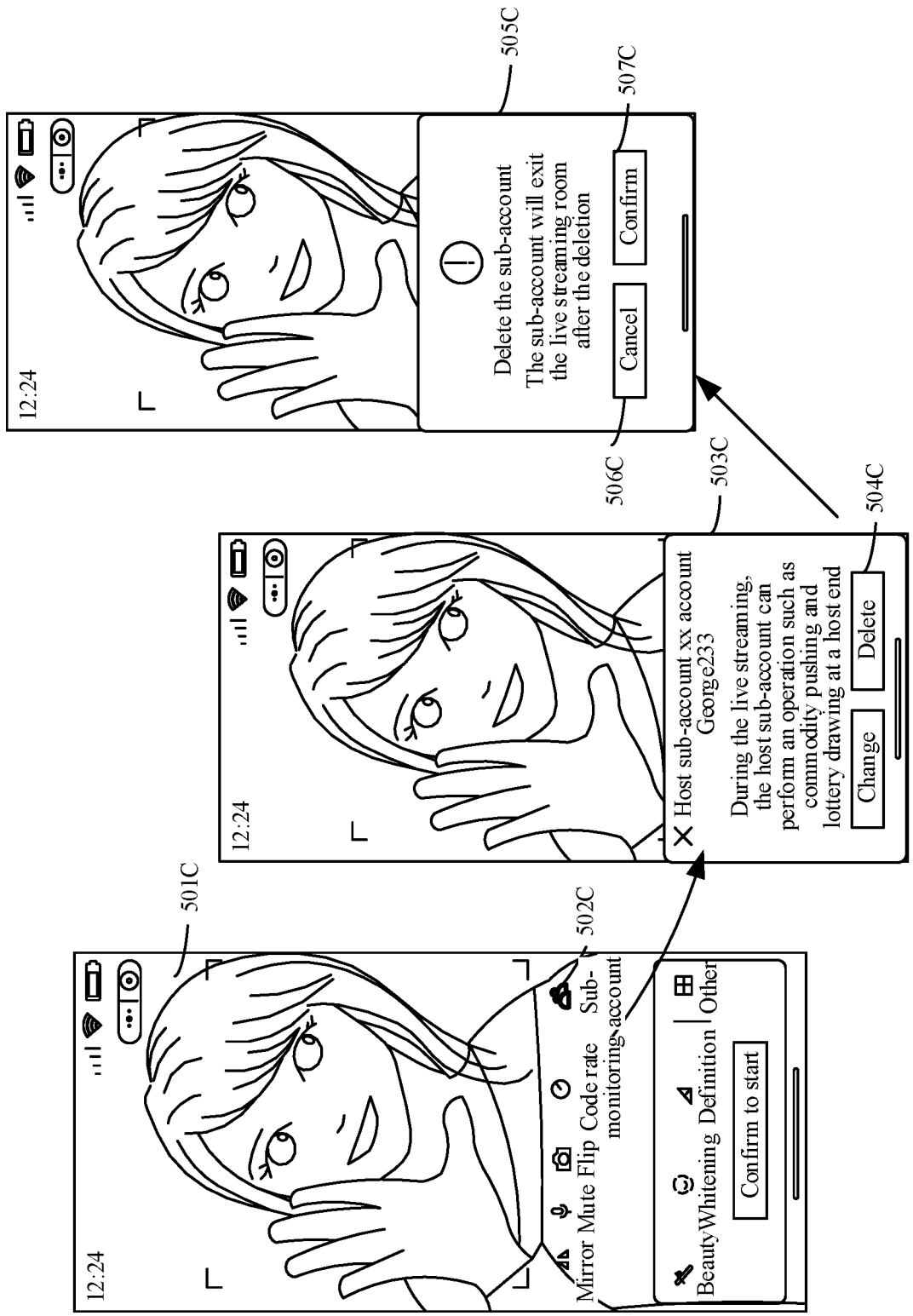

During the live streaming by the host, management of the live streaming room is realized through the host sub-account, for example, operations such as commodity pushing, lottery drawing, and muting are performed. Referring to FIG. 5A, a schematic interface diagram of a live streaming processing method according to an embodiment of this application is shown. FIG. 5A shows a process of adding a host sub-account through a host account, and 501A in FIG. 5A is an interface diagram of a host logging in to a live streaming room. A page 503A for adding a host sub-account is displayed by a trigger operation for a host sub-account control 502A. By a trigger operation for a cancel control 504A in the page 503A, the page 503A will be closed. By receiving an operation of inputting a host sub-account in the page 503A and a trigger operation for a confirm control 505A in the page 503A, a page 506A indicating that the addition is successful is displayed. When the host sub-account inputted in the page 503A is the same as the host account, a page 507A is displayed to remind that the sub-account and the host account are repeating. Referring to FIG. 5B, a schematic interface diagram of a live streaming processing method according to an embodiment of this application is shown. FIG. 5B shows a process of changing a host sub-account through a host account, and 501B in FIG. 5B is an interface diagram of a host logging in to a live streaming room. A page 503B of a host sub-account that has been added is displayed by a trigger operation for a host sub-account control 502B. A page 505B for changing the host sub-account will be displayed by a trigger operation for a change control 504B in the page 503B. By receiving an operation of inputting a host sub-account in the page 505B and a trigger operation for a confirm control 506B in the page 505B, a page 507B indicating that the change is successful is displayed. When the host sub-account after the change in the page 507B is the same as the host account, prompt information is displayed to remind that the sub-account and the host account are repeating. Referring to FIG. 5C, a schematic interface diagram of a live streaming processing method according to an embodiment of this application is shown. FIG. 5C shows a process of deleting a host sub-account through a host account, and 501C in FIG.

5C is an interface diagram of a host logging in to a live streaming room. A page 503C of a host sub-account that has been added is displayed by a trigger operation for a host sub-account control 502C. A page 505C of deleting the host sub-account will be displayed by a trigger operation for a delete control 504C in the page 503C. By receiving a trigger operation for triggering a cancel control 506C received in the page 505C, a delete operation will be undone. The host sub-account will be successfully deleted by a trigger operation for triggering a confirm control 507C received in the page 505C.

During configuration of the host sub-account, there are the following methods for configuring the host sub-account.

The host sub-account may be selected by the host or the live streaming system server in the live streaming client accounts that have been registered in the live streaming system. In an implementation, the ownership of this host sub-account still belongs to the registered user of the live streaming client account, but is granted (associated in the live streaming system server) identity information of the host sub-account and the permission to perform a live streaming operation. In an implementation, the live streaming client account may be a user account registered specially in the live streaming system, or a multiplexed third-party system account (for example, a third-party system account such as a social account) that can log in to the live streaming system. In an implementation, the live streaming system server determines a live streaming client account that can be configured as a sub-account, and performs prompting when the host needs to configure a sub-account. Alternatively, when the host submits a request of configuring a sub-account, a host sub-account is automatically assigned to the host. In a specific implementing process, a solution for the live streaming system server to determine live streaming client accounts that can be configured as sub-accounts is as follows: selecting live streaming client accounts that have a large quantity of historical interactions (likes and chats) with the host account in the live streaming room of the host; and selecting live streaming client accounts that are once configured as sub-accounts, the selection being performed in descending order of degrees of assistance (the quantity of participated live streaming and the number of operations) to historical live streaming of the host.

The host sub-account may be a new account that is requested, by the host end, to be created by the live streaming system server, or automatically created by the live streaming system server. The ownership of the host sub-account created in this way belongs to the host. In an implementation, when the host manually requests the live streaming system server for creation, the quantity may be set, and a name, an operation permission, and a validity period of the sub-account are set as well. If no setting is performed, a default name, permission, and validity period are assigned. It is also possible to only set the quantity, and a name (random) and a default permission and validity period are set automatically. In an implementation, the timing of the automatic creation by the live streaming system server includes: automatically creating a sub-account for a host account during creation of the host account; and monitoring live streaming data according to the host account, and automatically creating a sub-account for the host account when the created sub-account cannot manage the live streaming room (because there are too many operations to be performed). The method of assigning the operation permission is as follows: assigning whether the sub-account has permissions of various operations, or assigning an overall permission level of the sub-account (such as high, middle, and low; differences in levels reflect differences in the quantity of different types of operations that can be performed). The method of assigning the validity period is as follows: it may be a specific validity date (a maximum number of collaboration operations may be further set), a cumulative online duration, a daily online duration, a number of daily collaboration operations, or a cumulative number of collaboration operations. After the host sub-account is configured before the live streaming, the host sub-account can be configured and updated at any time.

Figure 5D:
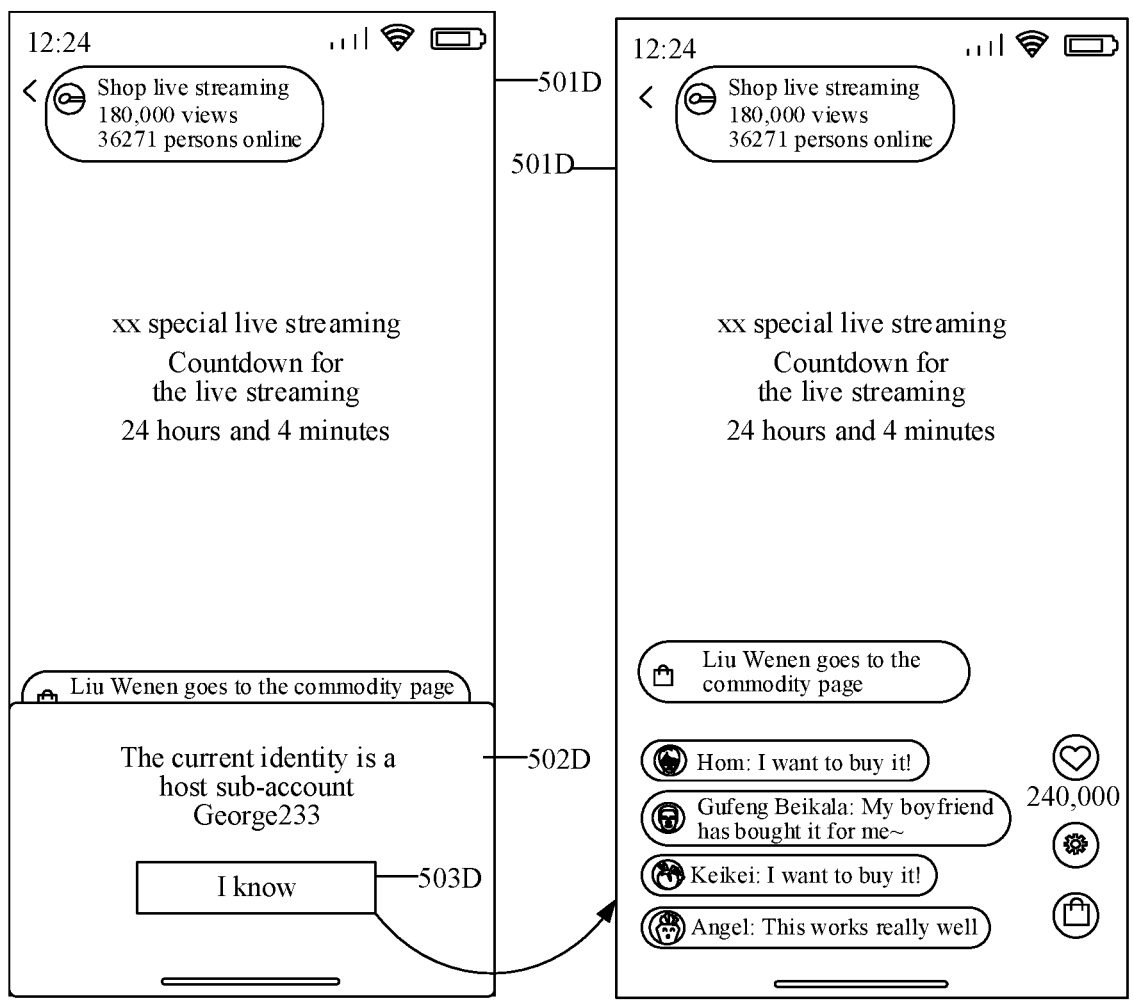
Figure 5E:
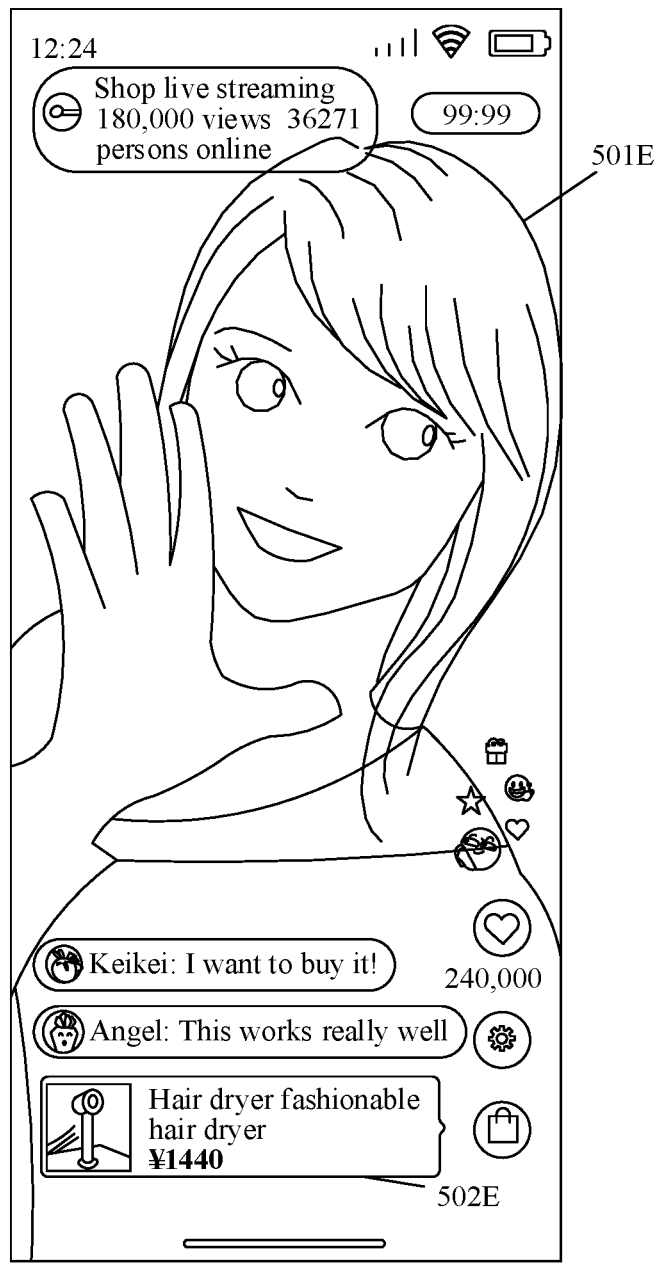
Figure 5F:
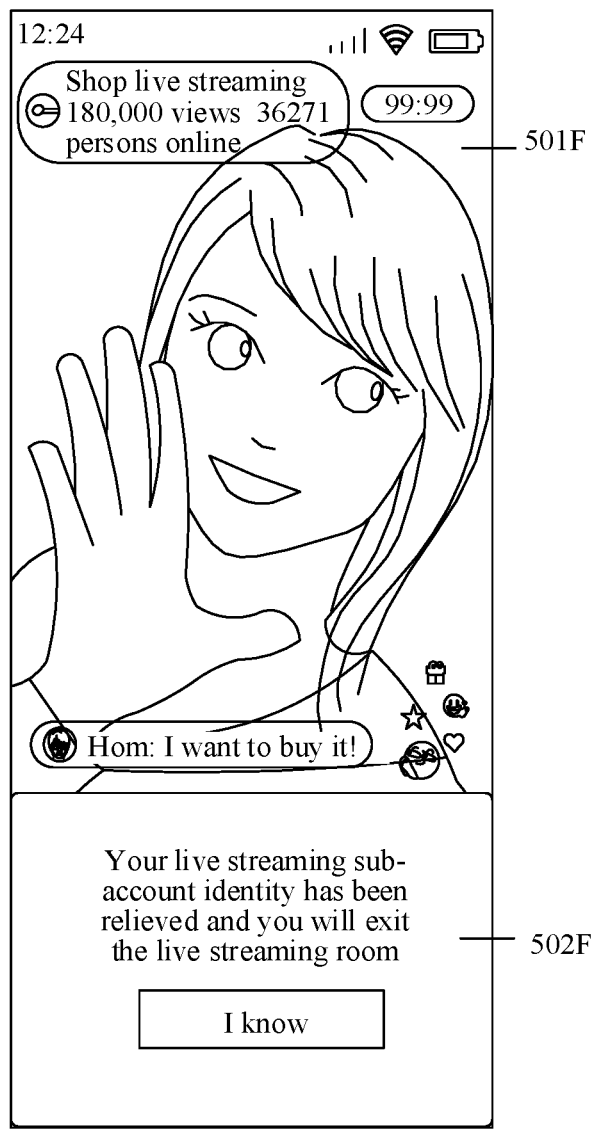

Referring to FIG. 5D, a schematic interface diagram of a live streaming processing method according to an embodiment of this application is shown. After the host sub-account enters the live streaming room, if the live streaming does not start, a live streaming waiting page 501D is displayed, and an identity of the current host sub-account is clearly informed in a pop-up window 502D of 501D. By receiving a trigger operation for a confirm control 503D of the pop-up window 502D, the live streaming waiting page 501D is displayed continuously. In a live streaming waiting process on the live streaming waiting page 501D, the host sub-account cannot initiate the live streaming. After the live streaming starts, most of live streaming room operations can be performed through the host sub-account, such as definition adjustment (setting a screen definition of a host end), lottery drawing (pushing a lottery in the live streaming room), mute (forbidding a user to post comments), commodity push (pushing a commodity to the live streaming room, where a commodity card will appear on a viewer end), commodity explanation (screen recording of the commodity explanation during the live streaming), coupon (pushing a coupon to the live streaming room, where a coupon card will appear on the viewer end). For example, referring to FIG. 5E, a schematic interface diagram of a live streaming processing method according to an embodiment of this application is shown. In FIG. 5E, a live streaming page 501E of the host sub-account is displayed, and commodity information 502E pushed by the host sub-account is displayed on the live streaming page 501E. Referring to FIG. 5F, a schematic interface diagram of a live streaming processing method according to an embodiment of this application is shown, and FIG. 5F shows a live streaming page 501F of the host sub-account. During the live streaming, the host sub-account may be deleted during the live streaming. After deletion, a pop-up window 502F will be displayed on the live streaming page 501F to remind that the host sub-account is relieved and will exit the live streaming room. In an actual application, the host sub-account may access a live streaming accessing function through an applet and enter a corresponding live streaming room.

In the process of applying the host sub-account, the host account and the host sub-account perform collaborative operations. The host sub-account and the host account log in to the live streaming room at the same time, a terminal to which the host account is logged in performs screen recording and sound collection, and synchronizes the performance to a viewer in the live streaming room. A terminal to which the host sub-account is logged in performs a live streaming room operation, and synchronizes an operation result to the viewer in the live streaming room. The operation result of the host sub-account may be transparent, that is, when the operation result is synchronized to the viewer through the live streaming system server, a trigger account of the operation result will be modified from the host sub-account to the host account, so that the viewer will consider that he/she is directly interacting with the host.

In a process of managing the host sub-account, automatic management of the host sub-account may be performed, such as recovery of the sub-account. For a sub-account that exceeds the validity period, the sub-account may be deleted or the permission of the host sub-account may be reclaimed. The definition of the validity period is as follows: a specific validity date, a maximum number of collaborative operations, a cumulative online duration, or a daily online duration. The validity period may further set an upper limit of the number of daily collaboration operations and an upper limit of the cumulative number of collaboration operations within the validity period. The validity period and the permission may be automatically maintained or actively maintained. For example, the host sub-account end may apply the host account for elevating the permission or extending the validity period. When the operation result submitted through the host sub-account end is synchronized to the viewer account via the server, the server marks a source of the operation result as the host account. Therefore, the viewer account can only perceive the existence of the host account, and the host sub-account is transparent to the viewer. There is no need to frequently perform account permission processing (permission elevation and permission degradation), and the live streaming effect and account security are guaranteed. In addition, the host may focus on the performance, which greatly improves the operation experience of the host, makes the viewer feel that he/she is interacting with the host, thereby shortening the distance between the host and the viewer, and optimizing the live streaming experience of the viewer.

Figure 6:
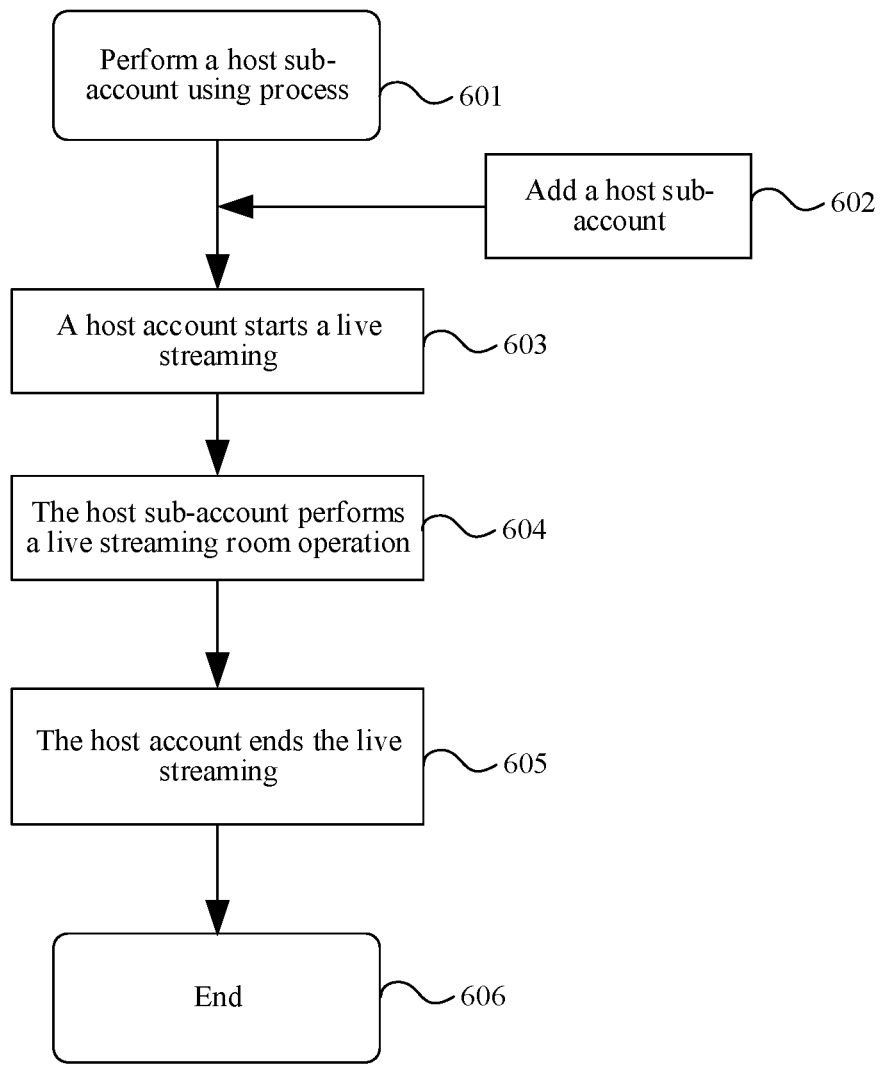
FIG. 6 is a flowchart of a live streaming processing method according to an embodiment of this application.
Figure 7:
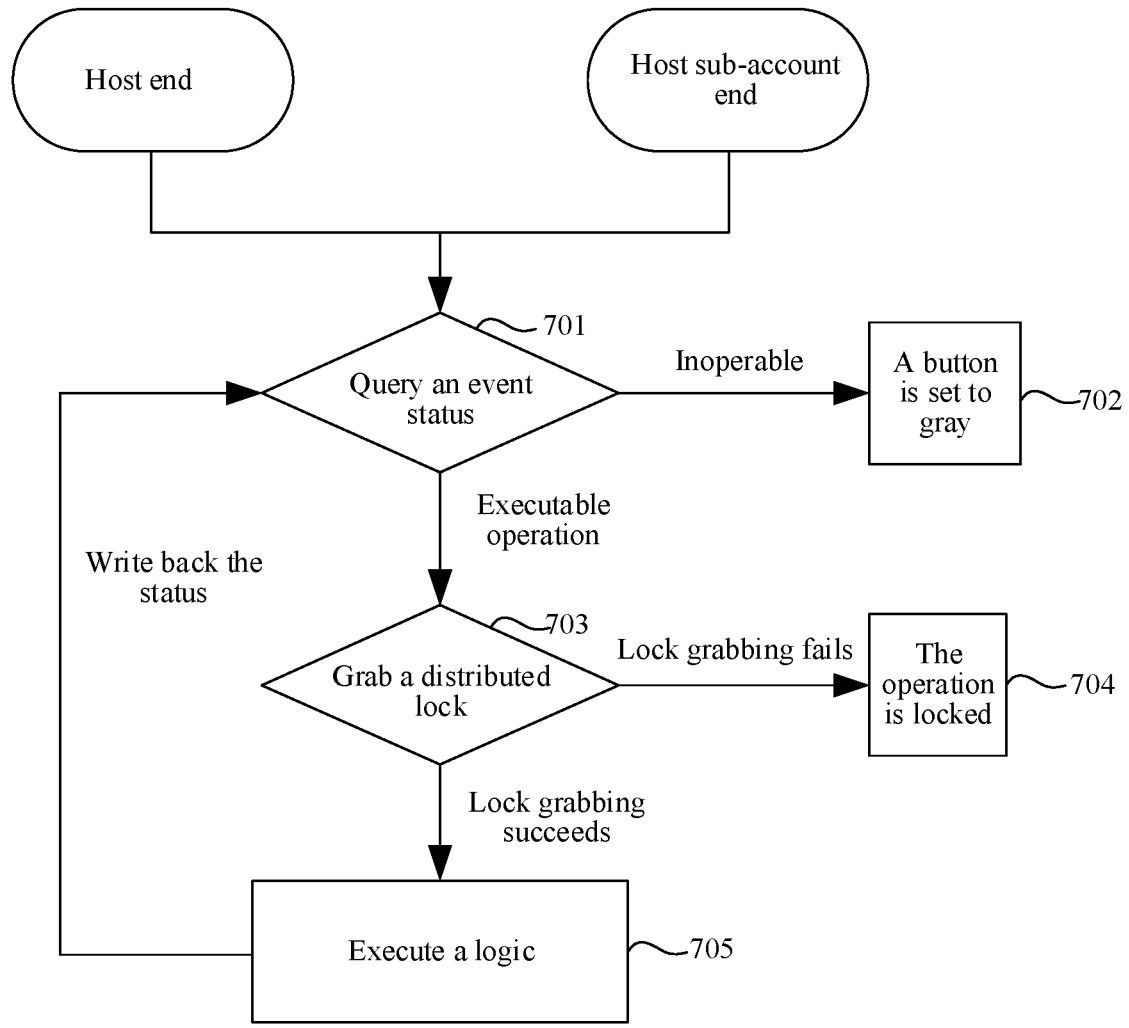
FIG. 7 is a flowchart of a live streaming processing method according to an embodiment of this application.

Referring to FIG. 6, a flowchart of a live streaming processing method according to an embodiment of this application is shown. In 601, a host sub-account using process is performed. In 602, a host sub-account is added, where the host sub-account is added first through a received host sub-account configuration operation of a host account. In 603, the host account starts a live streaming. During the live streaming of the host account, in 604, the host sub-account performs a live streaming room operation, and management to a live streaming room may be realized through the live streaming room operation of the host sub-account. In 605, the host account ends the live streaming. Finally, the live streaming is ended through the host account, and all processes are ended in 606. Referring to FIG. 7, a flowchart of a live streaming processing method according to an embodiment of this application is shown. In 701, a host end and a host sub-account end query an event status, if the event status is inoperable, in 702, a button is set to gray, and if the event status is operable, a distributed lock is grabbed in 703. If the lock grabbing fails, in 704, the operation is locked, and if the lock grabbing succeeds, in 705, an event logic is executed and the event status is written back. The distributed lock mechanism is used for realizing multi-end synchronization of the host account end, the host sub-account end, and the live streaming system server end. Both the host end and the host sub-account end query the event status of an event to be processed. When the event status is inexecutable, a button will be displayed in gray scale, indicating that the end cannot perform an operation. If the event status is executable, distributed lock grabbing is performed. For the end that fails to grab the lock, the operation is locked. If the lock grabbing succeeds, the event logic is executed and the event status is written back.

With the live streaming processing method according to the embodiments of this application, in a case of saving human resources of live streaming, the host does not need to pop out his/her head and reach out to operate the live streaming terminal during the live streaming, which greatly reduces the operation cost of the host. The viewer does not need to be interrupted by the operation of the host, which can not only achieve a smoother and more complete live streaming effect, but also improve the live streaming efficiency of the host.

An exemplary structure of a live streaming processing apparatus 455-1 provided by the embodiments of this application implemented as software modules will continue to be illustrated below. In some embodiments, as shown in FIG. 2, the software modules of the live streaming processing apparatus 455-1 stored in the memory 450 may include: a host sub-account login module 4551 configured to display a live streaming room; the host sub-account being in a logged-in status in the live streaming room; the host sub-account being different from a viewer account of the live streaming room and used for assisting a host account of the live streaming room in operation; a live streaming content display module 4552 configured to receive real-time live streaming data of the live streaming room, and display a live streaming content on a live streaming room page according to the real-time live streaming data, the real-time live streaming data being collected from the host account and the viewer accounts after logging in to the live streaming room based on the host account; and an operation result display module 4553 configured to display, in response to a live streaming room operation of the host sub-account, an operation result of the live streaming room operation of the host sub-account in the live streaming room.

In some embodiments, the host sub-account login module 4551 is further configured to display, during the displaying a live streaming room, a name of a host sub-account and login identity prompt information; the login identity prompt information being used for prompting that the live streaming room is logged in to with the identity of the host sub-account.

In some embodiments, during the displaying login identity prompt information, the host sub-account login module 4551 is further configured to display account attribute prompt information; the account attribute prompt information being used for prompting an account attribute of the host sub-account; and the account attribute including at least one of the following: operation permissions that the host sub-account has in the live streaming room; and a validity period of the host sub-account.

In some embodiments, the operation result display module 4553 is further configured to display invalid operation prompt information when the host sub-account lacks the permission to perform the live streaming room operation; the invalid operation prompt information being used for prompting a permission required to perform the live streaming room operation: transmitting a permission request to the host account in response to a permission application operation of the host sub-account, or automatically transmitting a permission request to the host account; and perform the live streaming room operation when the required permission is obtained.

In some embodiments, the operation result display module 4553 is further configured to: display account recovery prompt information when the host sub-account meets an account recovery condition; the account recovery condition including that an operation time of the live streaming room operation exceeds the validity period of the host sub-account operation; or an operation time of the live streaming room operation does not exceed the validity period of the host sub-account operation, but an upper limit of the number of operations within the validity period is reached; transmit a validity period renewal request to the host account in response to a validity period renewal application operation of the host sub-account, or automatically transmit a validity period renewal request to the host account; the validity period renewal request being used for requesting to extend the validity period of the host sub-account, or increasing the upper limit of the number of operations within the validity period of the host account; and the type of the upper limit of the number of operations including: the upper limit of the number of daily operations within the validity period, and the upper limit of the cumulative number of operations within the validity period.

In some embodiments, the operation result display module 4553 is further configured to: display automatic update prompt information of an account attribute of the host sub-account; the automatic update prompt information being used for prompting that the account attribute of the host sub-account has been updated; an update value of the account attribute being in positive correlation with a collaboration parameter of the host sub-account, and the collaboration parameter including one of the following: the number of operations of the host sub-account in participated the live streaming; and an online duration of the host sub-account in the participated live streaming.

In some embodiments, the live streaming room operation includes at least one of the following: a live streaming effect adjustment operation of the host sub-account, an information push operation of the host sub-account, and a mute operation of the host sub-account; the operation result display module 4553 is further configured to perform at least one of the following: displaying, in response to the live streaming effect adjustment operation of the host sub-account, a live streaming effect changing process of the host in real time in the live streaming room; displaying, in response to the information push operation of the host sub-account, recommendation information transmitted by the host account in the live streaming room; and displaying, in response to the mute operation of the host sub-account, a message indicating that the viewer account is muted by the host account in the live streaming room.

In some embodiments, when responding to the live streaming room operation of the host sub-account, the operation result display module 4553 is further configured to transmit live streaming room operation data corresponding to the live streaming room operation of the host sub-account to a live streaming system server; the live streaming room operation data being used for enabling the live streaming system server to perform the following processing: modifying a source account of the operation result of the live streaming room operation of the host sub-account to the host account, and transmitting the modified source account to a live streaming client of the viewer account of the live streaming room.

In some embodiments, the host sub-account is automatically configured by the live streaming system server in at least one of the following manners: automatically creating a new live streaming client account during creation of the host account by the live streaming system server, and configuring the automatically created live streaming client account as the host sub-account of the host account; and automatically creating a new live streaming client account by the live streaming system server when a quantity of host sub-accounts that have been configured for the host account is lower than a minimum quantity required for managing the live streaming room, and configuring the automatically created live streaming client account as the host sub-account of the host account.

In some embodiments, the host sub-account is configured for the host account by the live streaming system server in response to a request of the host account; and before the displaying a live streaming room, the apparatus 455 further includes a host sub-account configuration module 4554 configured to display, in response to a login operation of the host account in the live streaming room, a logged-in status of the host account in the live streaming room; request, in response to a host sub-account configuration operation of the host account, the live streaming system server to configure at least one host sub-account for the host account, and display a successfully configured host sub-account; and perform a sharing operation for the successfully configured host sub-account to a target live streaming client account.

In some embodiments, the host sub-account configuration module 4554 is configured to perform at least one of the following: requesting, in response to the host sub-account configuration operation of the host account, the live streaming system server to create at least one live streaming client account, and requesting the live streaming system server to configure the created at least one live streaming client account as a host sub-account of the host account; displaying a host sub-account setting page, acquiring, in response to the host sub-account configuration operation of the host account on the host sub-account setting page, a registered live streaming client account in the live streaming system server inputted by the host sub-account configuration operation, and requesting the live streaming system server to configure the registered live streaming client account as a host sub-account of the host account; and displaying at least one registered live streaming client account of the live streaming system server, acquiring, in response to the host sub-account configuration operation of the host account, at least one registered live streaming client account selected by the host sub-account configuration operation, and requesting the live streaming system server to configure the selected at least one registered live streaming client account as a host sub-account of the host account.

In some embodiments, the host sub-account configuration module 4554 is configured to acquire the registered live streaming client account in any of the following manners, and display the acquired registered live streaming client account: querying a plurality of registered live streaming client accounts that have interacted with the host account, and displaying, in descending order of the number of interactions, the plurality of live streaming client accounts obtained by querying; and querying a plurality of registered live streaming client accounts that have once been configured as host sub-accounts, and displaying, in descending order of collaboration parameters, the plurality of live streaming client accounts obtained by querying; wherein the collaboration parameter includes one of the following: the number of operations of the host sub-account in the participated live streaming; and an online duration of the host sub-account in the participated live streaming.

In some embodiments, the host sub-account configuration module 4554 is configured to display an editing page, the editing page including the host sub-account that has been configured for the host account and an account attribute; request, in response to a delete operation for any host sub-account, the live streaming system server to delete a target host sub-account at which the delete operation is aimed and a corresponding account attribute, and display, after the deletion, prompt information prompting that the target host sub-account has been deleted; and request, in response to an attribute editing operation for any host sub-account, the live streaming system server to update a new account attribute submitted by the attribute editing operation for the target host sub-account, and display, after the update, prompt information prompting that the new account attribute has been updated to.

An exemplary structure of a live streaming processing apparatus 455-2 provided by the embodiments of this application implemented as software modules will continue to be illustrated below. In some embodiments, as shown in FIG. 2, the software modules of the live streaming processing apparatus 455-2 stored in the memory 450 may include: a host sub-account configuration module 4555 configured to display, in response to a host sub-account configuration operation of a host account, a successfully configured host sub-account; the host sub-account being different from a viewer account of the live streaming room and used for assisting the host account of the live streaming room in operation; a live streaming content display module 4556 configured to display a live streaming content of the live streaming room; and an operation result synchronization module 4557 configured to receive an operation result of a live streaming room operation of the host sub-account, and display the operation result of the live streaming room operation of the host sub-account in the live streaming room.

In some embodiments, before the displaying a successfully configured host sub-account, the host sub-account configuration module 4555 is configured to request the live streaming system server to configure at least one host sub-account for the host account in at least one of the following manners: requesting, in response to the host sub-account configuration operation of the host account, the live streaming system server to create at least one live streaming client account, and requesting the live streaming system server to configure the created at least one live streaming client account as a host sub-account of the host account; displaying a host sub-account setting page, acquiring, in response to the host sub-account configuration operation of the host account on the host sub-account setting page, a registered live streaming client account in the live streaming system server inputted by the host sub-account configuration operation, and requesting the live streaming system server to configure the registered live streaming client account as a host sub-account of the host account; and displaying at least one registered live streaming client account of the live streaming system server, acquiring, in response to the host sub-account configuration operation of the host account, at least one registered live streaming client account selected by the host sub-account configuration operation, and requesting the live streaming system server to configure the selected at least one registered live streaming client account as a host sub-account of the host account.

In some embodiments, the host sub-account configuration module 4555 is configured to acquire the registered live streaming client account in any of the following manners, and display the acquired registered live streaming client account: querying a plurality of registered live streaming client accounts that have interacted with the host account, and displaying, in descending order of the number of interactions, the plurality of live streaming client accounts obtained by querying; and querying a plurality of registered live streaming client accounts that have once been configured as host sub-accounts, and displaying, in descending order of collaboration parameters, the plurality of live streaming client accounts obtained by querying; wherein the collaboration parameter includes one of the following: the number of operations of the host sub-account in the participated live streaming; and an online duration of the host sub-account in the participated live streaming.

In some embodiments, the host sub-account configuration module 4555 is configured to display an editing page, the editing page including the host sub-account that has been configured for the host account and an account attribute; request, in response to a delete operation for any host sub-account, the live streaming system server to delete a target host sub-account at which the delete operation is aimed and a corresponding account attribute, and display, after the deletion, prompt information prompting that the target host sub-account has been deleted; and request, in response to an attribute editing operation for any host sub-account, the live streaming system server to update a new account attribute submitted by the attribute editing operation for the target host sub-account, and display, after the update, prompt information prompting that the new account attribute has been updated to.

An embodiment of this application provides a computer program product or a computer program. The computer program product or the computer program includes a computer instruction. The computer instruction is stored in a computer-readable storage medium. The processor of the computer device reads the computer instructions from the computer-readable storage medium, and the processor executes the computer instructions to cause the computer device to perform the above live streaming processing method in the embodiments of this application.

A computer-readable storage medium storing executable instructions is provided in the embodiments of this application, the executable instructions are stored therein, and the executable instructions, when executed by a processor, will cause the processor to perform the live streaming processing method according to the embodiments of this application, for example, the live streaming processing method shown in FIG. 3A to FIG. 3E or FIG. 4.

In some embodiments, the computer-readable storage medium may be a memory such as a ferroelectric RAM (FRAM), a ROM, a programmable ROM (PROM), an electrically programmable ROM (EPROM), an electrically erasable PROM (EEPROM), a flash memory, a magnetic surface memory, an optical disk, or a CD-ROM, or may be any device including one of or any combination of the foregoing memories.

In some embodiments, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

In an example, the executable instructions may, but do not necessarily, correspond to a file in a file system, and may be stored in a part of a file that saves another program or other data, for example, be stored in one or more scripts in a HyperText Markup Language (HTML) file, stored in a file that is specially used for a program in discussion, or stored in a plurality of collaborative files (for example, be stored in files of one or more modules, subprograms, or code parts).

In an example, the executable instructions can be deployed for execution on one computing device, execution on a plurality of computing devices located at one location, or execution on a plurality of computing devices that are distributed at a plurality of locations and that are interconnected through a communication network.

To sum up, through the embodiments of this application, a host sub-account different from a viewer account is used, and a live streaming room operation is performed by the host sub-account that inherits the permission of a host account, which saves frequent modification operations of the permission of the host account for the viewer account, and thereby saving resource consumption of related background operations, and improving the information security. At the same time, because of the assistance of the host sub-account, a host possessing the host account can focus on the performance itself, thereby ensuring the quality of diversified contents outputted in a live streaming.

The foregoing descriptions are merely embodiments of this application and are not intended to limit the protection scope of this application. Any modification, equivalent replacement, or improvement made without departing from the spirit and range of this application shall fall within the protection scope of this application. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A live streaming processing method performed by an electronic device, the method comprising:
   displaying a live streaming room, the live stream room having an associated host account, a host sub-account and a plurality of viewer accounts, all accounts being in a logged-in status in the live streaming room, the host sub-account being different from the viewer accounts of the live streaming room and used for assisting the host account of the live streaming room in operation;
   receiving real-time live streaming data of the live streaming room, and displaying a live streaming content on a live streaming room page according to the real-time live streaming data, the real-time live streaming data being collected from the host account and the viewer accounts after logging in to the live streaming room; and
   displaying, in response to a live streaming room operation of the host sub-account, an operation result of the live streaming room operation of the host sub-account in the live streaming room, wherein the operation result of the live streaming room operation updates the live streaming content on the live streaming room page.

2. The method according to claim 1, wherein the method further comprises:
   during the displaying a live streaming room:
   displaying a name of the host sub-account and login identity prompt information;
   the login identity prompt information being used for prompting that the live streaming room is logged in to with the identity of the host sub-account.

3. The method according to claim 2, wherein the method further comprises:
   during the displaying login identity prompt information:
   displaying account attribute prompt information;
   the account attribute prompt information being used for prompting an account attribute of the host sub-account; and
   the account attribute comprising at least one of the following: operation permissions that the host sub-account has in the live streaming room; and a validity period of the host sub-account.

4. The method according to claim 1, wherein
   the live streaming room operation of the host sub-account comprises at least one of the following: a live streaming effect adjustment operation of the host sub-account, an information push operation of the host sub-account, and a mute operation of the host sub-account;
   the displaying, in response to a live streaming room operation of the host sub-account, an operation result of the live streaming room operation of the host sub-account in the live streaming room comprises:
   displaying, in response to the live streaming effect adjustment operation of the host sub-account, a live streaming effect changing process of the host in real time in the live streaming room;
   displaying, in response to the information push operation of the host sub-account, recommendation information transmitted by the host account in the live streaming room; and
   displaying, in response to the mute operation of the host sub-account, a message indicating that the viewer account is muted by the host account in the live streaming room.

5. The method according to claim 1, wherein the method further comprises:
   transmitting live streaming room operation data corresponding to the live streaming room operation of the host sub-account to a live streaming system server;
   the live streaming room operation data being used for enabling the live streaming system server to perform the following processing:
   modifying a source account of the operation result of the live streaming room operation of the host sub-account to the host account, and transmitting the modified source account to a live streaming client of the viewer account of the live streaming room.

6. The method according to claim 1, wherein
   the host sub-account is automatically configured by the live streaming system server in at least one of the following manners:
   automatically creating a new live streaming client account during creation of the host account by the live streaming system server, and configuring the automatically created live streaming client account as the host sub-account of the host account; and
   automatically creating a new live streaming client account when a quantity of host sub-accounts that have been configured for the host account is lower than a minimum quantity required for managing the live streaming room, and configuring the automatically created live streaming client account as the host sub-account of the host account.

7. The method according to claim 1, wherein
   the host sub-account is configured for the host account by the live streaming system server in response to a request of the host account; and
   before the displaying a live streaming room, the method further comprises:
   displaying, in response to a login operation of the host account in the live streaming room, a logged-in status of the host account in the live streaming room;
   requesting, in response to a host sub-account configuration operation of the host account, the live streaming system server to configure at least one host sub-account for the host account, and displaying a successfully configured host sub-account; and performing a sharing operation for the successfully configured host sub-account to a target live streaming client account.

8. The method according to claim 7, wherein the requesting, in response to a host sub-account configuration operation of the host account, the live streaming system server to configure at least one host sub-account for the host account comprises at least one of the following:

requesting, in response to the host sub-account configuration operation of the host account, the live streaming system server to create at least one live streaming client account, and requesting the live streaming system server to configure the created at least one live streaming client account as a host sub-account of the host account;

displaying a host sub-account setting page, acquiring, in response to the host sub-account configuration operation of the host account on the host sub-account setting page, a registered live streaming client account in the live streaming system server inputted by the host sub-account configuration operation, and requesting the live streaming system server to configure the registered live streaming client account as a host sub-account of the host account; and displaying at least one registered live streaming client account of the live streaming system server, acquiring, in response to the host sub-account configuration operation of the host account, at least one registered live streaming client account selected by the host sub-account configuration operation, and requesting the live streaming system server to configure the selected at least one registered live streaming client account as a host sub-account of the host account.

9. The method according to claim 8, wherein the displaying at least one registered live streaming client account of the live streaming system server comprises:

acquiring the registered live streaming client account in any of the following manners, and displaying the acquired registered live streaming client account:

querying a plurality of registered live streaming client accounts that have interacted with the host account, and displaying, in descending order of the number of interactions, the plurality of live streaming client accounts obtained by querying; and querying a plurality of registered live streaming client accounts that have once been configured as host sub-accounts, and displaying, in descending order of collaboration parameters, the plurality of live streaming client accounts obtained by querying;

wherein the collaboration parameter comprises one of the following: the number of operations of the host sub-account in the participated live streaming; and an online duration of the host sub-account in the participated live streaming.

10. The method according to claim 7, wherein the method further comprises:

displaying an editing page, the editing page comprising the host sub-account that has been configured for the host account and an account attribute;

requesting, in response to a delete operation for any host sub-account, the live streaming system server to delete a target host sub-account at which the delete operation is aimed and a corresponding account attribute, and displaying, after the deletion, prompt information prompting that the target host sub-account has been deleted; and requesting, in response to an attribute editing operation for any host sub-account, the live streaming system server to update a new account attribute submitted by the attribute editing operation for the target host sub-account, and displaying, after the update, prompt information prompting that the new account attribute has been updated to.

11. An electronic device, comprising:

a memory configured to store executable instructions;

a processor configured to implement, when executing the executable instructions stored in the memory, a live streaming processing method, the method including:

displaying a live streaming room, the live stream room having an associated host account, a host sub-account and a plurality of viewer accounts, all accounts being in a logged-in status in the live streaming room, the host sub-account being different from the viewer accounts of the live streaming room and used for assisting the host account of the live streaming room in operation;

receiving real-time live streaming data of the live streaming room, and displaying a live streaming content on a live streaming room page according to the real-time live streaming data, the real-time live streaming data being collected from the host account and the viewer accounts after logging in to the live streaming room; and displaying, in response to a live streaming room operation of the host sub-account, an operation result of the live streaming room operation of the host sub-account in the live streaming room, wherein the operation result of the live streaming room operation updates the live streaming content on the live streaming room page.

12. The electronic device according to claim 11, wherein the method further comprises:

during the displaying a live streaming room:

displaying a name of the host sub-account and login identity prompt information;

the login identity prompt information being used for prompting that the live streaming room is logged in to with the identity of the host sub-account.

13. The electronic device according to claim 11, wherein the live streaming room operation of the host sub-account comprises at least one of the following: a live streaming effect adjustment operation of the host sub-account, an information push operation of the host sub-account, and a mute operation of the host sub-account;

the displaying, in response to a live streaming room operation of the host sub-account, an operation result of the live streaming room operation of the host sub-account in the live streaming room comprises:

displaying, in response to the live streaming effect adjustment operation of the host sub-account, a live streaming effect changing process of the host in real time in the live streaming room;

displaying, in response to the information push operation of the host sub-account, recommendation information transmitted by the host account in the live streaming room; and displaying, in response to the mute operation of the host sub-account, a message indicating that the viewer account is muted by the host account in the live streaming room.

14. The electronic device according to claim 11, wherein the method further comprises:

transmitting live streaming room operation data corresponding to the live streaming room operation of the host sub-account to a live streaming system server;

the live streaming room operation data being used for enabling the live streaming system server to perform the following processing:

modifying a source account of the operation result of the live streaming room operation of the host sub-account to the host account, and transmitting the modified source account to a live streaming client of the viewer account of the live streaming room.

15. The electronic device according to claim 11, wherein the host sub-account is automatically configured by the live streaming system server in at least one of the following manners:

automatically creating a new live streaming client account during creation of the host account by the live streaming system server, and configuring the automatically created live streaming client account as the host sub-account of the host account; and automatically creating a new live streaming client account when a quantity of host sub-accounts that have been configured for the host account is lower than a minimum quantity required for managing the live streaming room, and configuring the automatically created live streaming client account as the host sub-account of the host account.

16. The electronic device according to claim 11, wherein the host sub-account is configured for the host account by the live streaming system server in response to a request of the host account; and before the displaying a live streaming room, the method further comprises:

displaying, in response to a login operation of the host account in the live streaming room, a logged-in status of the host account in the live streaming room;

requesting, in response to a host sub-account configuration operation of the host account, the live streaming system server to configure at least one host sub-account for the host account, and displaying a successfully configured host sub-account; and performing a sharing operation for the successfully configured host sub-account to a target live streaming client account.

17. A non-transitory computer-readable storage medium storing executable instructions that, when executed by a processor of an electronic device, cause the electronic device to perform a live streaming processing method, the method including:

displaying a live streaming room, the live stream room having an associated host account, a host sub-account and a plurality of viewer accounts, all accounts being in a logged-in status in the live streaming room, the host sub-account being different from the viewer accounts of the live streaming room and used for assisting the host account of the live streaming room in operation;

receiving real-time live streaming data of the live streaming room, and displaying a live streaming content on a live streaming room page according to the real-time live streaming data, the real-time live streaming data being collected from the host account and the viewer accounts after logging in to the live streaming room; and displaying, in response to a live streaming room operation of the host sub-account, an operation result of the live streaming room operation of the host sub-account in the live streaming room, wherein the operation result of the live streaming room operation updates the live streaming content on the live streaming room page.

18. The non-transitory computer-readable storage medium according to claim 17, wherein the method further comprises:

during the displaying a live streaming room:

displaying a name of the host sub-account and login identity prompt information;

the login identity prompt information being used for prompting that the live streaming room is logged in to with the identity of the host sub-account.

19. The non-transitory computer-readable storage medium according to claim 17, wherein the live streaming room operation of the host sub-account comprises at least one of the following: a live streaming effect adjustment operation of the host sub-account, an information push operation of the host sub-account, and a mute operation of the host sub-account;

the displaying, in response to a live streaming room operation of the host sub-account, an operation result of the live streaming room operation of the host sub-account in the live streaming room comprises:

displaying, in response to the live streaming effect adjustment operation of the host sub-account, a live streaming effect changing process of the host in real time in the live streaming room;

displaying, in response to the information push operation of the host sub-account, recommendation information transmitted by the host account in the live streaming room; and displaying, in response to the mute operation of the host sub-account, a message indicating that the viewer account is muted by the host account in the live streaming room.

20. The non-transitory computer-readable storage medium according to claim 17, wherein the method further comprises:

transmitting live streaming room operation data corresponding to the live streaming room operation of the host sub-account to a live streaming system server;

the live streaming room operation data being used for enabling the live streaming system server to perform the following processing:

modifying a source account of the operation result of the live streaming room operation of the host sub-account to the host account, and transmitting the modified source account to a live streaming client of the viewer account of the live streaming room.

* * * * *